(12) United States Patent
Melville

(10) Patent No.: US 10,928,627 B2
(45) Date of Patent: Feb. 23, 2021

(54) THERMALLY ACTUATED CANTILEVERED BEAM OPTICAL SCANNER

(71) Applicant: Magic Leap, Inc., Plantation, FL (US)

(72) Inventor: Charles David Melville, Camano Island, WA (US)

(73) Assignee: Magic Leap, Inc., Plantation, FL (US)

( * ) Notice: Subject to any disclaimer, the term of this patent is extended or adjusted under 35 U.S.C. 154(b) by 143 days.

(21) Appl. No.: 16/197,165

(22) Filed: Nov. 20, 2018

(65) Prior Publication Data
US 2019/0155019 A1 May 23, 2019

Related U.S. Application Data

(60) Provisional application No. 62/590,073, filed on Nov. 22, 2017.

(51) Int. Cl.
*G02B 26/10* (2006.01)
*G02B 27/01* (2006.01)
*H04N 1/113* (2006.01)

(52) U.S. Cl.
CPC .......... *G02B 26/10* (2013.01); *G02B 26/103* (2013.01); *G02B 27/0172* (2013.01); *H04N 1/113* (2013.01)

(58) Field of Classification Search
CPC .. G02B 26/10; G02B 26/103; G02B 27/0172; G02B 26/0841; G02B 26/105;

(Continued)

(56) References Cited

U.S. PATENT DOCUMENTS 4,410,235 A 10/1983 Klement et al.
5,715,337 A 2/1998 Spitzer et al.
(Continued)

FOREIGN PATENT DOCUMENTS

WO 2017008164 A1 1/2017

OTHER PUBLICATIONS

Jain, "Low Voltage, Mems-Based Reflective and Refractive Optical Scanners for Endoscopic Biomedical Imaging", A Dissertation Presented to the Graduate School of the University of Florida in Partial Fulfillment of the Requirements for the Degree of Doctor of Philosophy, Available Online at, URL;http://ufdcimages.uflib.ufl.edu/UF/E0/01/57/28/00001/iain_a.pdf, 2006, 181 pages.

(Continued)

*Primary Examiner* — Jennifer D. Carruth
(74) *Attorney, Agent, or Firm* — Kilpatrick Townsend & Stockton LLP

(57) ABSTRACT

Embodiments of optical scanners, optical projection systems, and methods of scanning optical waveguides and projecting images are described. The disclosed devices, systems and methods advantageously provide an improvement to the compactness, robustness, simplicity, and reliability of optical scanners and optical projection systems by implementing a thermally driven actuator for inducing oscillations of a cantilever within the optical scanners and optical projection systems. The stability and accuracy of optical scanners and optical projection systems are further enhanced using capacitive sensing, feedback, and phase correction techniques described herein.

20 Claims, 10 Drawing Sheets

(58) Field of Classification Search
CPC .............. G02B 26/085; G02B 26/0858; G02B 26/0833; G02B 26/101; H04N 1/113; B81B 3/0083; B81B 3/0086; B81B 2203/04

See application file for complete search history.

(56) References Cited

U.S. PATENT DOCUMENTS

| | | | |
|---|---|---|---|
| 5,925,822 | A | 7/1999 | Naughton |
| 6,118,124 | A | 9/2000 | Thundat et al. |
| 6,169,965 | B1 | 1/2001 | Kubisiak et al. |
| 6,679,055 | B1 | 1/2004 | Ellis |
| 8,220,067 | B2 | 7/2012 | Adams et al. |
| 8,914,911 | B2 | 12/2014 | King et al. |
| 2004/0122328 | A1 | 6/2004 | Wang et al. |
| 2005/0121615 | A1 | 6/2005 | Prater et al. |
| 2006/0007514 | A1 | 1/2006 | Desai |
| 2007/0194656 | A1 | 8/2007 | Takayanagi et al. |
| 2008/0180771 | A1* | 7/2008 | Watanabe .............. H02K 33/12 359/199.1 |
| 2008/0265178 | A1 | 10/2008 | Johnston |
| 2015/0205126 | A1 | 7/2015 | Schowengerdt |
| 2017/0276934 | A1* | 9/2017 | Sarkar ...................... A61B 3/15 |
| 2018/0052276 | A1 | 2/2018 | Klienman et al. |
| 2018/0052277 | A1 | 2/2018 | Schowengerdt et al. |
| 2018/0052320 | A1 | 2/2018 | Curtis et al. |
| 2018/0052501 | A1 | 2/2018 | Jones et al. |
| 2018/0059297 | A1 | 3/2018 | Peroz et al. |
| 2018/0059304 | A1 | 3/2018 | Bhargava et al. |

OTHER PUBLICATIONS

PCT/US2018/062095, "International Search Report and Written Opinion", dated Feb. 5, 2019, 9 pages.

EP18881306.7, "Extended European Search Report", dated Nov. 18, 2020, 10 pages.

* cited by examiner

THERMALLY ACTUATED CANTILEVERED BEAM OPTICAL SCANNER

CROSS-REFERENCES TO RELATED APPLICATIONS

This application claims the benefit of U.S. Provisional Patent Application No. 62/590,073, filed Nov. 22, 2017, the contents of which is hereby incorporated by reference in its entirety.

BACKGROUND OF THE INVENTION

Since the advent of the smartphone, the great utility of having a versatile and always available device capable of general purpose computing and multimedia communication has been realized by the public at large. Nonetheless a pronounced drawback of smartphones is the relatively small screen size. Smartphone display screens are a small fraction of the size of even small laptop computer screens.

It is now contemplated that smartphones will eventually be replaced or indispensably supplemented by augmented reality glasses that will, among other things, effectively provide users with a relatively large field of view 3D imagery output system that is accessible to users, at will, whether for business or entertainment purposes.

SUMMARY OF THE INVENTION

Beyond merely exceeding the screen size afforded by a laptop and without the encumbrance of carrying a laptop, augmented reality glasses will provide new mixed reality applications that seamlessly integrate the real world and virtual content. This not only preserves the user's engagement with the real world, but also enables new types of augmentation of the physical world, such as, for example: automatically generated contextually relevant information overlaid on automatically recognized real world objects; communication between remotely situated persons through 3D dimensional avatars of each party presented at the other party's location; and mixed reality games that include virtual content behaving realistically, e.g., respecting boundaries of physical objects in the real world.

One form of augmented reality includes a set of transparent eyepieces that are configured to couple light from left and right sources of imagewise modulated light to a user's eyes. Thus the user can view the real world while simultaneously viewing virtual imagery. Separate left and right imagery that is stereoscopically correct may be provided. Additionally the curvature of the wavefront of light carrying the imagery can be controlled based on the intended distance of virtual objects included in the virtual imagery from the user. Both of the foregoing measures contribute to the user's perception that viewed imagery is three dimensional. A substantially diminished form of augmented reality glasses can provide a small field of view of virtual imagery to one eye.

It would be desirable to reduce the size and weight of augmented reality glasses to values approaching those of typical eyeglasses. An obstacle to doing so is often the source of imagewise modulated light. Even highly miniaturized projectors based on 2D focal plane array light modulators as Liquid Crystal on Silicon (LCoS), or Digital Micromirror Device (DMD) will typically occupy a few cubic centimeters of volume and weight a few grams. One highly compact source of imagewise modulated light is the fiber scanner. The fiber scanner includes an optical fiber extending through a piezoelectric drive tube. Construction of the fiber scanner involves painstaking manual assembly and epoxy bonding procedures which would be a cost issue for a mass produced product. Another issue with fiber scanners can be the significant unit-to-unit variations in the piezoelectric drive tubes. A further issue with fiber scanners is that the imagery they produce is somewhat distorted and the distortion varies from one video frame to the next. The distortion is believed to be attributable in part to the variations in the piezoelectric scanner tubes and possibly variations resulting from the assembly of the fiber and the piezoelectric scanner tube.

Therefore, there is a need in the art for a compact optical scanner suitable for compact augmented reality glasses that is amenable to mass production and includes provisions for scan pattern control.

This application relates to optical scanning and projection systems and methods of projecting images. More specifically, and without limitation, this application relates to thermally driven microcantilever-based optical scanners and projection systems and associated methods of projecting images. The disclosed microcantilever-based optical scanners and projection systems include cantilevered beams having a set of resistive heating elements for inducing controllable thermal expansion in the cantilevered beams in order to oscillate the cantilevered beams in a desirable fashion to allow projection of a two-dimensional image.

In an aspect, optical scanning devices are described. For example, an optical scanning device may comprise a base, a cantilevered beam extending from the base, such as a cantilevered beam that includes a proximal end attached to the base and a distal end (e.g., a free or unsupported distal end), at least one optical waveguide positioned on the base and the cantilevered beam and extending from the base along the cantilevered beam from the proximate end to the distal end, and a plurality of heaters disposed on the cantilevered beam.

A variety of heater configurations are useful with the optical scanning devices described herein. For example, optionally, the plurality of heaters are disposed on the cantilevered beam proximate to the proximal end. In a specific embodiment, the plurality of heaters comprise four heaters. Optionally, the plurality of heaters are spaced about the cantilevered beam. For example, the cantilevered beam may have a top side and a bottom side, and, optionally, the plurality of heaters includes a first heater, a second heater, a third heater, and a fourth heater. In one arrangement, a first heater and a second heater are disposed on the top side and a third heater and a fourth heater are disposed on the bottom side. Optionally, the heaters are disposed on corners of the cantilevered beam, such as where the cantilevered beam has a rectangular cross section.

The cantilevered beam, the base, and/or other components may be fabricated using techniques of microfabrication, including patterning, masking, lithography, etching, deposition, lift-off, sacrificial layers or substrates, etc. Various materials and constructions may be used. For example, the cantilevered beam and the base may optionally be monolithic and integrally formed, such as from a single crystal or polycrystalline material. Optionally, the cantilevered beam and/or the base may comprise silicon carbide, silicon, or diamond. These materials may be useful, in embodiments, as these materials exhibit large heat conductivities, which may be considerably greater than other materials, such as silicon dioxide or silicon nitride. Optionally, the heaters may comprise resistive materials, such as platinum or silicon, e.g., doped silicon. Optionally, the heaters are patterned in specific locations on the cantilevered beam to provide precise locations for introduction of heat to induce thermal expansion in the cantilevered beam to cause oscillations to occur by repeated and alternating heating of the cantilevered beam followed by thermal relaxation by conduction of the heat from the cantilevered beam to the base. In embodiments, the optical scanning device may further comprise a plurality of electrical traces independently extending over the base to the plurality of heaters.

The optical scanning devices may comprise one or more optical elements to allow for light to be projected by the optical scanning device. For example, an optical scanning device may optionally further comprise at least one laser diode positioned on the base, such as at least one laser diode that is optically coupled to the at least one optical waveguide. Optionally, the at least one laser diode may be positioned remotely from the base. For example, an optical scanning device may further comprise an optical fiber mechanically engaged with the base, such as an optical fiber that is optically coupled to the at least one optical waveguide. In this way, the optical fiber may provide optical communication between the at least one laser diode and the optical waveguide to allow light from the at least one laser diode to be received by and transmitted or projected from the optical waveguide. In embodiments, the at least one optical waveguide has a cross-sectional dimension less than or equal to 10 microns. For example, the optical waveguide optionally has a cross-sectional width of between 1 and 10 microns, inclusive. Optionally, the optical waveguide has a cross-sectional height between 1 and 10 microns, inclusive.

In some embodiments, an optical scanning system of provided. The optical scanning system may comprise a resonantly oscillatable optical scanning member, a first conductor disposed on the resonantly oscillatable optical scanning member, a second conductor disposed adjacent to the resonantly oscillatable optical scanning member, and a capacitive sensing circuit. The capacitive sensing circuit may be coupled to the first conductor and the second conductor and may be configured to generate a capacitance modulated signal that is modulated by a varying capacitance between the first conductor and the second conductor. The optical scanning system may further comprise an electrical signal to mechanical force transducer coupled to the resonantly oscillatable optical scanning member. The electrical signal to mechanical force transducer may include an electrical signal input.

In some embodiments, the optical scanning system may further comprise a phase correction circuit coupled to the capacitive sensing circuit and to the electrical signal to mechanical force transducer. In some embodiments, the optical scanning system may further comprise a timing signal generator coupled through the phase correction circuit to the electrical signal to mechanical force transducer. The phase correction circuit may be configured to adjust a phase of a timing signal that is received from the timing signal generator to generate a phase adjusted timing signal based, at least in part, on the capacitance modulated signal. The phase adjusted timing signal may be passed to the electrical signal to mechanical force transducer. In some embodiments, the optical scanning system may further comprise a light source optically coupled to the resonantly oscillatable optical scanning member, and circuitry for driving the light source. The circuitry for driving the light source may be electrically coupled to the timing signal generator. In some embodiments, the phase correction circuit may comprise a phase detection circuit coupled to a phase shift circuit. The phase detection circuit may be coupled to the capacitive sensing circuit. The phase shift circuit may include an input coupled to the timing signal generator and an output coupled to the electrical signal to mechanical force transducer.

In some embodiments, a source of imagewise modulated light may comprise the optical scanning system described herein and may further comprise a frame buffer, a timing signal generator for generating a timing signal, read circuitry, and a phase correction circuit. The read circuitry may be coupled to the frame buffer and the timing signal generator. The read circuitry may be configured to read out pixel data from the frame buffer in a spiral pattern at times determined by the timing signal generator. The phase correction circuit may be coupled to the timing signal generator and the read circuitry and may be further coupled to the capacitive sensing circuit. The phase correction circuit may be configured to adjust the timing signal based on the capacitance modulated signal.

In some embodiments, a method of projecting an image is provided. The method comprises actuating a plurality of heaters of an optical scanning device to induce oscillation of a distal end of a cantilevered beam of the optical scanning device. The optical scanning device may comprise a base, the cantilevered beam, an optical waveguide, and a plurality of heaters disposed on the cantilevered beam. The cantilevered beam may extend from the base and include a proximal end attached to the base and a distal end. The optical waveguide may be positioned on the base and the cantilevered beam and may extend from the base to the distal end of the cantilevered beam. The method further comprises actuating one or more laser diodes to generate laser light. The one or more laser diodes may be optically coupled to the optical waveguide. The laser light may be transmitted from the optical waveguide at the distal end of the cantilevered beam to project an image.

In some embodiments, actuating the plurality of heaters may increase temperatures of a plurality of regions of the cantilevered beam and may induce thermal expansion of the plurality of regions of the cantilevered beam. The thermal expansion of the plurality of regions of the cantilevered beam may cause deflections of the distal end of the cantilevered beam corresponding to the oscillation. In some embodiments, the plurality of regions of the cantilevered beam correspond to quadrant sections.

In some embodiments, the one or more laser diodes may be optically coupled to the optical waveguide via one or more optical fibers that are optically coupled to the one or more laser diodes and the optical waveguide. In some embodiments, the optical scanning device may further comprise a first capacitive sensing electrode disposed on the cantilevered beam and a second capacitive sensing electrode disposed adjacent to the cantilevered beam. The method may further comprise detecting a capacitance signal corresponding to a capacitance between the first capacitive sensing electrode and the capacitive sensing electrode. The method may further comprise generating a phase calibrated timing signal using a reference timing signal and a phase shift between the reference timing signal and the capacitance signal. In some embodiments, the plurality of heaters may be actuated according to the phase calibrated timing signal and the one or more laser diodes may be actuated according to the reference timing signal. Alternatively, the plurality of heaters may be actuated according to the reference timing signal and the one or more laser diodes may be actuated according to the phase calibrated timing signal.

In some embodiments, the oscillation may correspond to deflecting the distal end of the cantilevered beam in a spiral pattern and the image may correspond to a two-dimensional image. In some embodiments, actuating the one or more laser diodes may include obtaining spiral pattern pixel data from a frame buffer, converting the spiral pattern pixel data to one or more drive signals, and electrically coupling the one or more drive signals to the one or more laser diodes.

In some embodiments, an image projection system is provided. The image projection system comprises a resonantly oscillatable optical scanning member including an optical waveguide for transmitting visible light. The system further comprises a first conductor disposed on the resonantly oscillatable optical scanning member. The system further comprises a second conductor disposed adjacent to the resonantly oscillatable optical scanning member. The system further comprises a capacitive sensing circuit coupled to the first conductor and the second conductor. The capacitive sensing circuit may be configured to generate a capacitance modulated signal that is modulated by a varying capacitance between the first conductor and the second conductor. The system further comprises an electrical signal to mechanical force transducer coupled to the resonantly oscillatable optical scanning member to induce oscillations of the resonantly oscillatable optical scanning member. The system further comprises a timing signal generator configured to output a timing signal. The system further comprises a phase correction circuit coupled to the capacitive sensing circuit and the timing signal generator. The phase correction circuit may be configured to adjust a phase of the timing signal to generate a phase adjusted timing signal based, at least in part, on the capacitance modulated signal.

In some embodiments, the system further comprises a light source optically coupled to the optical waveguide and circuitry for driving the light source. The circuitry for driving the light source may be electrically coupled to the timing signal generator to receive the timing signal. Alternatively, the circuitry for driving the light source may be electrically coupled to the phase correction circuit to receive the phase adjusted timing signal. In some embodiments, the electrical signal to mechanical force transducer may be electrically coupled to the timing signal generator for inducing oscillations of the resonantly oscillatable scanning member according to the timing signal. Alternatively, the electrical signal to mechanical force transducer may be electrically coupled to the phase correction circuit for inducing oscillations of the resonantly oscillatable scanning member according to the phase adjusted timing signal.

The optical scanning devices described herein may be used in a variety of configurations. For example, the optical scanning devices may be useful as a component of an augmented reality device, such as augmented reality glasses comprising the optical scanning device and further comprising a transparent eyepiece optically coupled to the optical scanning device. For example, the transparent eyepiece may be configured to couple light received from the optical scanning device to an eye position defined in relation to the transparent eyepiece, while also allowing environmental light to pass through the transparent eyepiece to the eye position.

In embodiments, the disclosed optical scanning devices may include other components. For example, an optical scanning device may optionally further comprise one or more side arms extending from the base and adjacent to a first side of the cantilevered beam. Optionally, one or more capacitive sensing electrodes may be incorporated into an optical scanning device. For example, an optical scanning device optionally further comprises a first capacitive sensing metallization disposed on the cantilevered beam and a second capacitive sensing metallization disposed on a side arm. The capacitive sensing metallizations may correspond to capacitive sensing electrodes, such as a first capacitive sensing electrode disposed on the cantilevered beam, and a second capacitive sensing electrode disposed adjacent to the cantilevered beam.

Capacitive sensing metallizations or electrodes may be useful for providing feedback, such as in optical scanning systems comprising the optical scanning device. Optionally, an optical scanning system comprises an optical scanning device including a first capacitive sensing electrode and a second capacitive sensing electrode; a capacitive sensing circuit coupled to the first capacitive sensing electrode and the second capacitive sensing electrode; a timing signal generator; a phase detection circuit coupled to the timing signal generator and the capacitive sensing circuit, such as a phase detection circuit configured to receive a timing signal from the timing signal generator, to receive a varying capacitance modulated signal from the capacitive sensing circuit, and to output a phase shift control signal at a phase shift control signal output; a phase shift circuit having a timing signal input coupled to the timing signal generator, a phase control input coupled to the phase shift control signal output, and a phase adjusted signal output, such as a phase shift control circuit that is configured to phase shift the timing signal by an amount in accordance with the phase shift control signal to produce a phase calibrated timing signal; a multiphase heating power signal generator coupled to the phase shift circuit, such as a multiphase heating power signal generator that includes a plurality of heating signal outputs that are coupled to the plurality of heaters disposed on the cantilevered beam and configured to receive the phase calibrated timing signal from the phase shift circuit and to output, at the plurality of heating signal outputs, a plurality of heating power signals that are timed based on the calibrated timing signal.

It will be appreciated that the capacitive sensing techniques may be used in other optical scanning or projection systems generally. For example, in one embodiment, an optical scanning system comprises a resonantly oscillatable optical scanning member; a first conductor disposed on the resonantly oscillatable optical scanning member; a second conductor disposed adjacent to the resonantly oscillatable optical scanning member; a capacitive sensing circuit coupled to the first conductor and the second conductor and configured to generate a capacitance modulated signal that is modulated by a varying capacitance between the first conductor and the second conductor; and an electrical signal to mechanical force transducer coupled to the resonantly oscillatable optical scanning member, the electrical signal to mechanical force transducer including an electrical signal input.

Optionally, an optical scanning system may further comprise a phase correction circuit coupled to the capacitive sensing circuit and to the electrical signal to mechanical force transducer; and a timing signal generator coupled through the phase correction circuit to the electrical signal to mechanical force transducer. Optionally, the phase correction circuit is configured to adjust a phase of a timing signal that is received from the timing signal generator to generate a phase adjusted timing signal based, at least in part, on the capacitance modulated signal. Optionally, the phase adjusted timing signal is passed to the electrical signal to mechanical force transducer.

Useful optical scanning systems include those further comprising a light source optically coupled to the resonantly oscillatable optical scanning member, and circuitry for driving the light source, such as circuitry for driving the light source that is electrically coupled to the timing signal generator. Optionally, the phase correction circuit comprises a phase detection circuit coupled to a phase shift circuit, such as a phase detection circuit that is coupled to the capacitive sensing circuit, and a phase shift circuit that includes an input coupled to the timing signal generator and an output coupled to the electrical signal to mechanical force transducer.

The optical scanning systems and optical scanning devices may be useful, in embodiments, as sources of imagewise modulated light. For example, a source of imagewise modulated light may correspond to a projection system. Optionally, a source of imagewise modulated light comprises an optical scanning system; a frame buffer; a timing signal generator for generating a timing signal; read circuitry coupled to the frame buffer and the timing signal generator, the read circuitry configured to read out pixel data from the frame buffer in a spiral pattern at times determined by the timing signal generator; a phase correction circuit coupled to the timing signal generator and the read circuitry and further coupled to the capacitive sensing circuit, such as a phase correction circuit that is configured to adjust the timing signal based on the capacitance modulated signal.

Methods are also disclosed herein, such as methods of operating an optical scanning system, an optical scanning device, or projecting one or more images. Methods of this aspect may optionally comprise actuating a plurality of heaters of an optical scanning device to induce oscillation of a distal end of a cantilevered beam of the optical scanning device, such as an optical scanning device that comprises a base, a cantilevered beam, such as a cantilevered beam that extends from the base and includes a proximal end attached to the base and a distal end, an optical waveguide positioned on the base and the cantilevered beam and extending from the base to the distal end of the cantilevered beam, and a plurality of heaters disposed on the cantilevered beam; and actuating one or more laser diodes to generate laser light. Optionally, the one or more laser diodes are optically coupled to the optical waveguide. Optionally, the laser light is transmitted from the optical waveguide at the distal end of the cantilevered beam to project an image.

It will be appreciated that actuating the plurality of heaters may increase temperatures of a plurality of regions of the cantilevered beam and induce thermal expansion of the plurality of regions of the cantilevered beam. For example, the thermal expansion of the plurality of regions of the cantilevered beam may cause deflections of the distal end of the cantilevered beam corresponding to the oscillation. Optionally, the plurality of regions of the cantilevered beam correspond to quadrant sections. It will be appreciated that the one or more laser diodes may optionally be optically coupled to the optical waveguide via one or more optical fibers that are optically coupled to the one or more laser diodes and the optical waveguide or optionally positioned on the base and directly optically coupled to the optical wave.

As described above, capacitive sensing electrodes may be useful as feedback mechanisms to control the actuation of the heating elements and optical sources (e.g. laser diodes). Optionally, an optical scanning device further comprises a first capacitive sensing electrode disposed on the cantilevered beam and a second capacitive sensing electrode disposed adjacent to the cantilevered beam. For example, a method of this aspect may further comprise detecting a capacitance modulated signal corresponding to a capacitance between the first capacitive sensing electrode and the second capacitive sensing electrode; and generating a phase calibrated timing signal using a reference timing signal and a phase shift between the reference timing signal and the capacitance signal. Different actuation configurations may be used incorporating the reference timing signal and the phase adjusted timing signal. For example, the plurality of heaters are optionally actuated according to the phase calibrated timing signal while the one or more laser diodes are actuated according to the reference timing signal. Optionally, the plurality of heaters are actuated according to the reference timing signal and the one or more laser diodes are actuated according to the phase calibrated timing signal.

As described above, the oscillation may corresponds to deflecting the distal end of the cantilevered beam in a spiral pattern. The projected image may correspond to a two-dimensional image. To appropriately project the image, various details may be used. For example, actuating the one or more laser diodes optionally includes obtaining spiral pattern pixel data from a frame buffer; converting the spiral pattern pixel data to one or more drive signals; and electrically coupling the one or more drive signals to the one or more laser diodes.

The optical scanning systems and optical scanning devices described herein may also be useful in image projection systems. Various aspects described herein may be useful in image projection systems generally. For example, an image projection system may comprise a resonantly oscillatable optical scanning member including an optical waveguide for transmitting visible light; a first conductor disposed on the resonantly oscillatable optical scanning member; a second conductor disposed adjacent to the resonantly oscillatable optical scanning member; a capacitive sensing circuit coupled to the first conductor and the second conductor and configured to generate a capacitance modulated signal that is modulated by a varying capacitance between the first conductor and the second conductor; an electrical signal to mechanical force transducer coupled to the resonantly oscillatable optical scanning member to induce oscillations of the resonantly oscillatable optical scanning member; a timing signal generator configured to output a timing signal; and a phase correction circuit coupled to the capacitive sensing circuit and the timing signal generator, such as a phase correction circuit that is configured to adjust a phase of the timing signal to generate a phase adjusted timing signal based, at least in part, on the capacitance modulated signal.

Useful image projection systems include those comprising a light source optically coupled to the optical waveguide; and circuitry for driving the light source, such as circuitry for driving the light source that is electrically coupled to the timing signal generator to receive the timing signal or circuitry for driving the light source that is electrically coupled to the phase correction circuit to receive the phase adjusted timing signal.

Useful resonantly oscillatable optical scanning members include a cantilevered beam supporting an optical waveguide and a cantilevered optical fiber. Useful electrical signal to mechanical force transducers include heaters positioned on a structure to induce thermal expansion and deflection by heating the structure as well as piezoelectric structures that can induce physical expansion and deflection by exposing the piezoelectric structures to a voltage. Optionally, the electrical signal to mechanical force transducer is electrically coupled to the timing signal generator for inducing oscillations of the resonantly oscillatable scanning member according to the timing signal. Optionally, the electrical signal to mechanical force transducer is electrically coupled to the phase correction circuit for inducing oscillations of the resonantly oscillatable scanning member according to the phase adjusted timing signal.

The foregoing, together with other features and embodiments, will become more apparent upon referring to the following description, claims and accompanying drawings.

DETAILED DESCRIPTION OF SPECIFIC EMBODIMENTS

Figure 1:
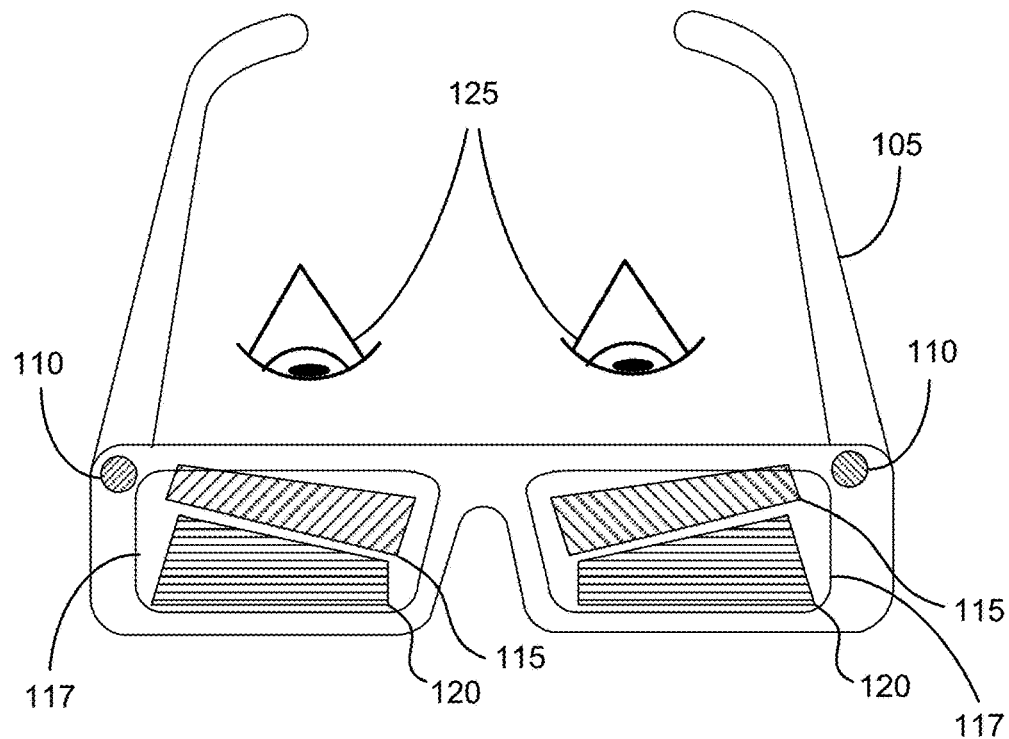
FIG. 1 provides a schematic illustration of a wearable augmented reality system embodiment.

Described herein are embodiments of optical scanners, optical projection systems, and methods of scanning optical waveguides and projecting images. The disclosed devices and systems advantageously provide an improvement to the compactness, robustness, simplicity, and reliability of optical scanners and optical projection systems by implementing a thermally driven actuator for inducing oscillations of a cantilever within the optical scanners and optical projection systems.

The disclosed devices may include a microscale optical scanning element, which may be exemplified, for example, as a microcantilever, also referred to herein as a cantilever, a cantilevered beam, and the like. A cantilever may refer to a platform, beam, or other partially suspended structure that is supported by a base on only a single end, referred to herein as the proximal end, while the opposite end, referred to herein as the distal end, is unsupported. The components of an optical scanning element may be fabricated through techniques borrowed from the art of microfabrication, including patterning, lithography, masking, etching, liftoff, deposition, and other techniques.

Advantageously, the optical scanning elements may include crystalline and/or polycrystalline materials. In some embodiments, components of an optical scanning element, such as a microcantilever and supporting base, may be fabricated from materials having relatively high thermal conductivities, such as silicon, silicon carbide, diamond, and the like. Example useful thermal conductivities include those greater than about 50 W/m·K, selected from the range of 50 W/m·K to 2500 W/m·K, or selected from the range of 100 W/m·K to 500 W/m·K. The use of materials having high thermal conductivities may be advantageous for more quickly dissipating heat introduced by a thermal actuator.

Materials useful in the optical scanning elements described herein may further exhibit non-zero coefficients of thermal expansion to allow cantilevered beams to deflect when regions of the cantilevered beams are heated. Example linear coefficients of thermal expansion useful with various embodiments include those having values greater than $1\times10^{-6}$/K, selected from the range of $1\times10^{-6}$/K to $50\times10^{-6}$/K, or selected from the range of $1\times10^{-6}$/K to $10\times10^{-6}$/K.

Other materials may be incorporated into optical scanning elements described herein for various purposes. For example, metals may be incorporated as electrically conducting elements or resistive heating elements, for example. For example, copper, aluminum, gold, and/or silver may be useful as conductive materials. Other low resistivity materials may be similarly useful, such as doped silicon, doped silicon carbide, etc. Certain materials may be useful as heating elements, such as platinum, low doped silicon, silicon oxide, silicon nitride, metal oxides, etc. In embodiments, these materials may exhibit suitable electrical resistivity to allow for useful generation of heat at specific locations by passing a current through the material.

The disclosed optical scanning elements may exhibit any suitable characteristic resonant frequencies in the cantilevered beam, such as between 20 kHz to 250 kHz, depending on the application and construction of the devices. In some embodiments, a characteristic resonant frequency of about 62 kHz may be employed. Sizes of the cantilevered beam scanner components may dictate the characteristic resonant frequencies. Suitable dimensions of a cantilevered beam may include a thickness of between 50 µm and 250 µm, a width of between 50 µm and 250 µm, and a length of 500 µm to 2000 µm. Example dimensions for a cantilevered beam include about 100 µm in width, about 100 µm in thickness, and about 1000 µm in length.

The optical scanners and optical projection systems described herein may be useful, for example, in wearable augmented reality systems, such as augmented reality glasses that incorporate transparent eyepieces to allow both light from the environment and light generated by an optical projection system to reach a user's eye. FIG. 1 provides a schematic illustration of a wearable augmented reality system 100 including a frame 105. Light generated by an optical projection system (not shown in FIG. 1) is received by an input optical element 110, which directs light through a first pupil expansive optical element 115 and a second pupil expansive optical element 120 to direct at least a portion of the projected light to user eye positions 125. The input optical element 110, the first pupil expansive optical element 115, and the second pupil expansive optical element 120 are components of an eyepiece 117. The eyepiece 117 may include a transparent material and the input optical element 110, the first pupil expansive optical element 115, and the second pupil expansive optical element 120 may take the form of surface relief or volume micro-optical elements, such as gratings. It will be appreciated that the eye positions 125 represent an approximate location of a user's eye in order for the user's eyes to receive light from both the frame 105 and from the environment, as the pupil expansive optical elements 115 and 120 are at least partially transmissive in the visible spectral region. Details of the configuration of wearable augmented reality systems and associated components are further described in U.S. Provisional Patent Application No. 62/377,831, filed on Aug. 22, 2016, and U.S. Non-provisional patent application Ser. Nos. 15/683,412, 15/683,624, 15/683,638, 15/683,644, 15/683,702, and 15/683,706, filed on Aug. 22, 2017. These applications are hereby incorporated by reference in their entireties.

Figure 2:
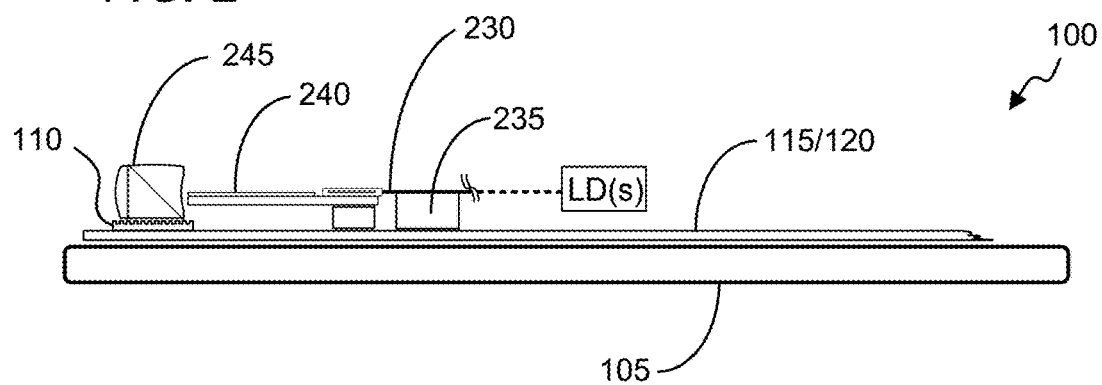
FIG. 2 provides a schematic illustration of a wearable optical device depicting details of an optical projection system including an optical scanning device, in accordance with some embodiments.

Further details of the augmented reality system 100 are schematically depicted in FIG. 2, which depicts frame 105, a fiber optic 230, one or more mechanical supports 235, a cantilevered optical scanner 240, a collimating and coupling optic 245, and various optical elements including input optical element 110 and pupil expansive optical elements 115 and 120.

Figure 3:
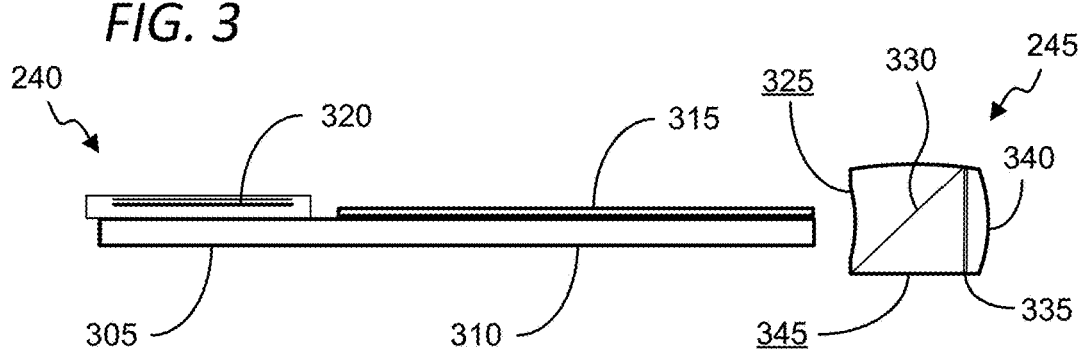
FIG. 3 provides a schematic illustration of an optical scanning device configuration according to some embodiments.

FIG. 3 provides a schematic illustration of cantilevered optical scanner 240. Cantilevered optical scanner 240 includes a base 305 and a cantilevered beam 310. Optionally base 305 and cantilevered beam 310 are integrally and monolithically formed and represent different portions of a single device element. For example, base 305 may be attached to another substrate or support component, while cantilevered beam 310 may be attached to base 305 at a proximal position and freestanding (i.e., unsupported) at a distal position. Cantilevered beam 310 is depicted in FIG. 3 as supporting an optical waveguide 315 to couple light from an input element to a collimating and coupling optic 245, which may allow for collimating and redirecting incident light. Base 305 may support or be constructed to include a v-groove 320, which may correspond to a mechanical coupling element to position an optical fiber at a location to optically couple the core of the optical fiber to the optical waveguide 315. Light from the optical waveguide 315 is directed to coupling optic 245, where it is collimated and directed to other optical components, such as input optical element 110 of augmented reality system 100. Linearly polarized light from the optical waveguide 315 enters an input surface 325 of the coupling optic 245, is transmitted through a polarization beam splitter (PBS) 330 and reaches a quarter wave plate (QWP) 335. According to alternative embodiments, the light may be s-polarized or p-polarized as judged at incidence on the PBS 330. Upon passing through the QWP 335 the polarization state of the light is converted from linearly polarized to circularly polarized light (e.g., according to alternative embodiments the circularly polarized light may be RHCP or LHCP dependent on the orientation of the QWP). The light is then reflected by a concave mirror 340. Upon reflection the circular polarized state of the light is reversed (i.e. switched from RHCP to LHCP or vice versa). Thereafter upon once again passing through the QWP 335 the light will be changed to a linear polarization state that is perpendicular to the initial linear polarization state and therefore will be reflected by the PBS 330 down toward an exit surface 345. Upon passing through the exit surface 345 the light, now collimated, will enter the input optical element 110. The collimated light will be redirected by the input optical element and the pupil expansive optical elements 115 and 120 to user eye positions 125. Light entering the input optical element 110 takes the form of a beam of light the angle of which is varied according to the instantaneous position of the distal tip of the optical waveguide 315. Each angle of the beam corresponds an image pixel defined in angular coordinates. The first pupil expansive element 115 incrementally redirects light down (in the perspective of FIG. 1) toward the second pupil expansive optical element 120 thereby increasing a horizontal width of the beam. The second pupil expansive optical element 120 incrementally redirects light out, generally towards the user eye position, thereby increasing the vertical height of the beam. It will be appreciated that some light may also be directed outward away from the user eye position. Expansion of the horizontal width and vertical height fills an eyebox which provides a tolerance for movement of the user's pupil while maintaining visibility of the output imagery.

Figure 4:
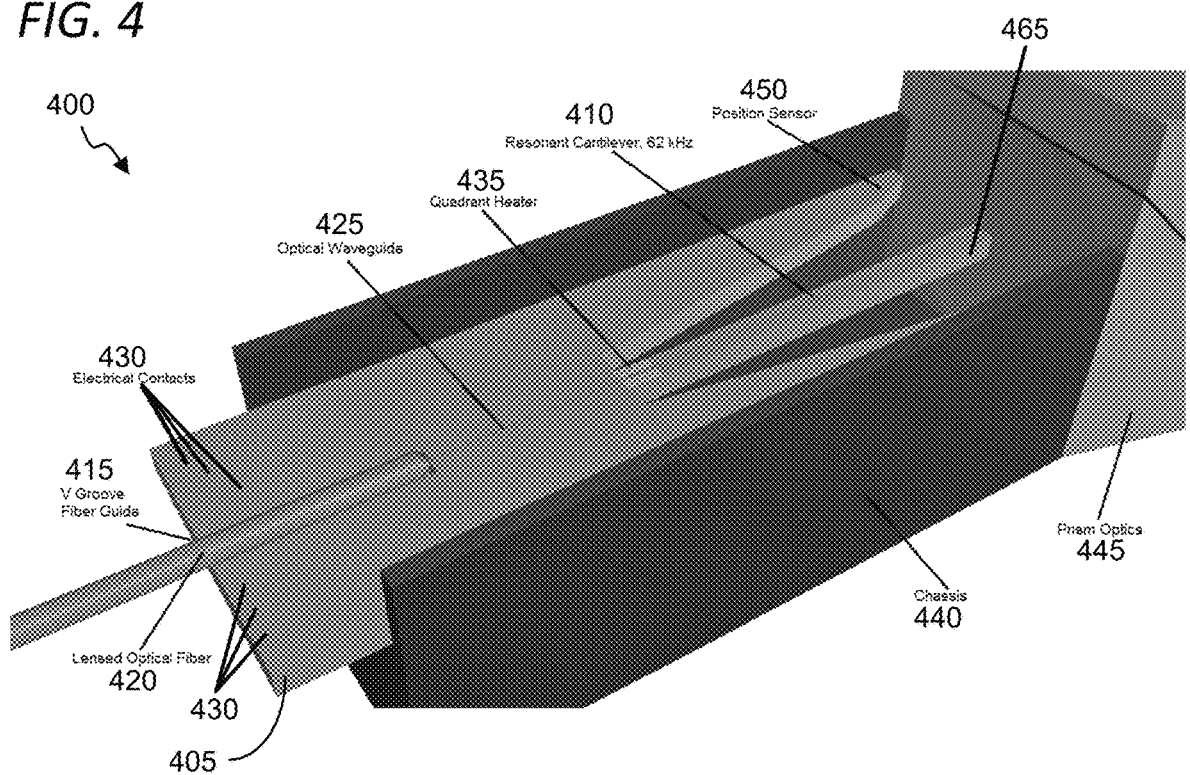
FIG. 4 provides a perspective schematic view of an optical scanning device, providing details of various device elements accordance with some embodiments.

FIG. 4 provides a perspective schematic view of an optical scanning device 400. Optical scanning device 400 includes base 405 and cantilevered beam 410. Base 405 includes a v-groove 415 for positioning an optical fiber 420, such as a lensed optical fiber, at a position for optical communication between a core of optical fiber 420 and an optical waveguide 425. Base 405 also includes electrical contacts 430, arranged in electrical communication with other elements, including heating elements 435 disposed on cantilevered beam 410. A chassis 440 surrounds other components and may be used to support base 405 and optical element 445 and ensure proper positioning of optical element 445 with respect to cantilevered beam 410 and optical waveguide 425. Optical scanning device 400 is illustrated in FIG. 4 as including position sensing contacts 450 and 465, which may be useful for sensing the distance between cantilevered beam 410 and position sensing contact 450, such as by way of time-dependent capacitance measurements between position sensing contact 450 and position sensing contact 465, to provide position information for cantilevered beam 410.

Figure 5:
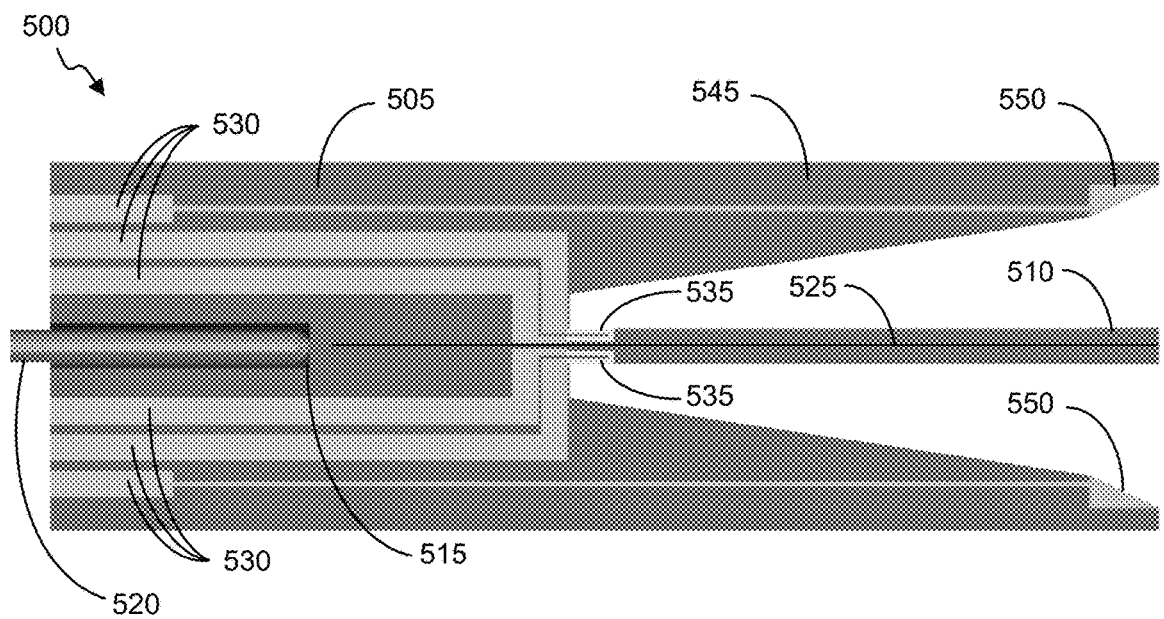
FIG. 5 provides a top plan schematic illustration of an optical scanning device accordance with some embodiments.

FIG. 5 provides a top plan schematic view of optical scanning device 500. Optical scanning device 500 is similar to and/or may correspond to optical scanning device 400 depicted in FIG. 4. In one example, optical scanning device 500 may be a 62 kHz MEMS resonant spiral optical scanner. Optical scanning device 500 includes base 505 and cantilevered beam 510. Base 505 includes a v-groove 515 for positioning an optical fiber 520 at a position for optical communication between a core of optical fiber 520 and an optical waveguide 525. Base 505 also includes electrical contacts 530, arranged in electrical communication with other elements, such as heating elements 535 disposed on cantilevered beam 510. Optical scanning device 500 is illustrated in FIG. 5 as including extensions 545, which are positioned adjacent to cantilevered beam 510, with extensions 545 including sensing electrodes 550, which may be useful for time-dependent capacitance measurements, as described above and below with reference to FIG. 15.

Figure 6:
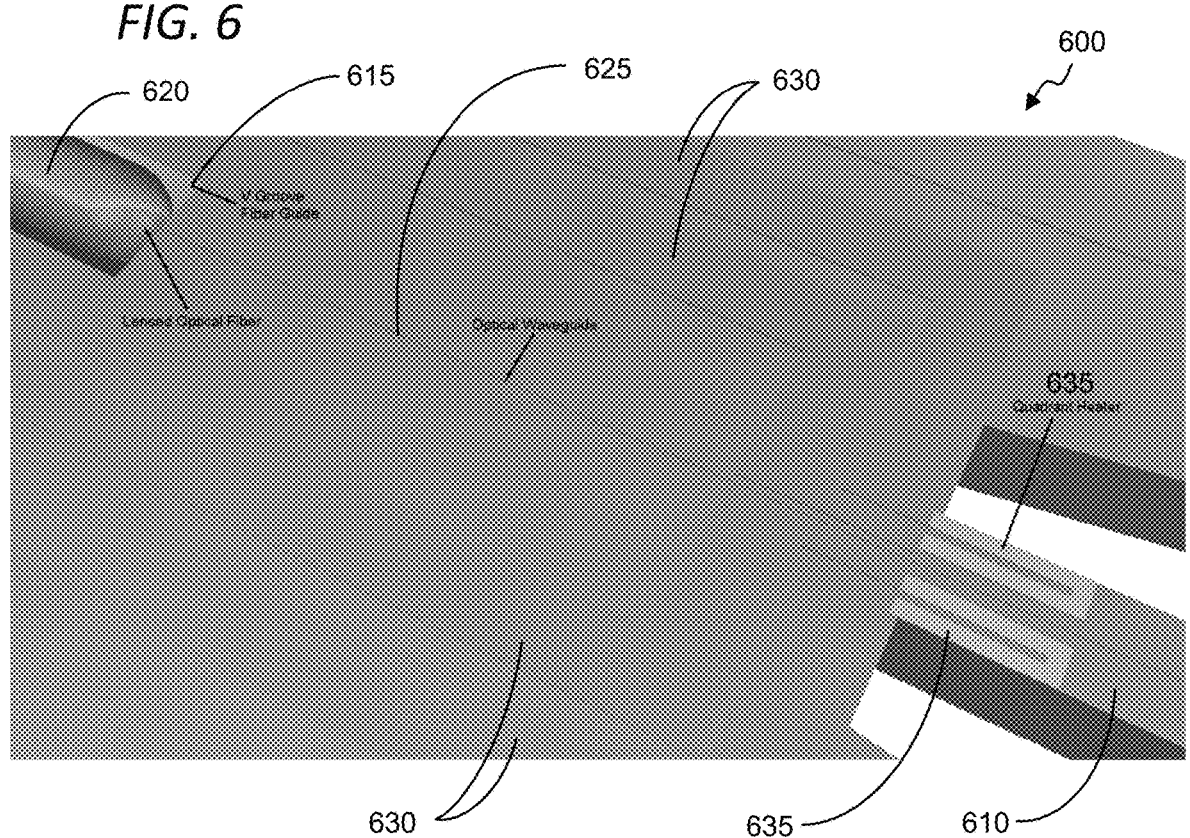
FIG. 6 provides a zoomed schematic view of a portion of an optical scanning device accordance with some embodiments.

FIG. 6 provides a zoomed perspective view of an optical scanning device 600. Optical scanning device 600 is similar to and/or may correspond to optical scanning devices 400 and 500 depicted in FIGS. 4 and 5. Optical scanning device 600 is shown with an end of optical fiber 620 engaged in v-groove 615 and positioned in alignment with and/or optically coupled to optical waveguide 625. Electrical traces 630 are shown providing electrical connections to heating elements 635 positioned on cantilevered beam 610.

Figure 7:
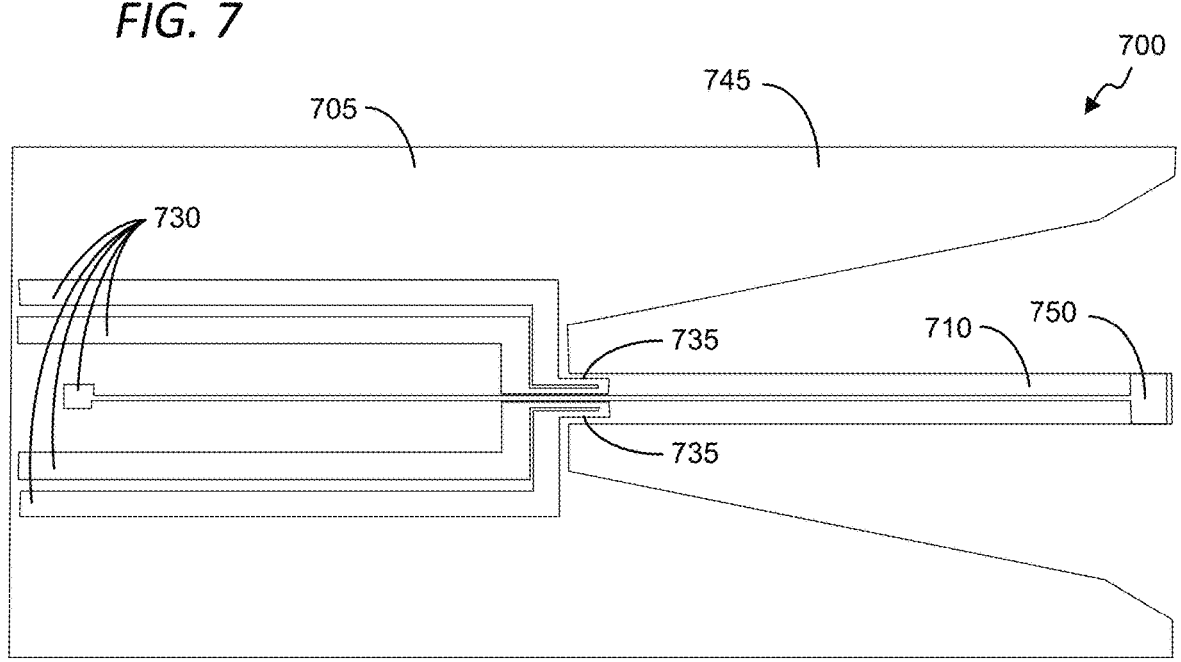
FIG. 7 provides a bottom plan schematic illustration of an optical scanning device in accordance with some embodiments.

FIG. 7 provides a bottom plan view schematic illustration of an optical scanning device 700. Optical scanning device 700 is similar to and/or may correspond to optical scanning devices 400, 500, and 600 depicted in FIGS. 4-6. Optical scanning device 700 includes base 705 and cantilevered beam 710. Optical scanning device 700 is illustrated in FIG. 7 as including a sensing contact 750, which may be useful for identifying the distance between cantilevered beam 710 and position sensing contacts (not visible in FIG. 7) on top sides of extensions 745, such as by way of time-dependent capacitance measurements, to provide position information for cantilevered beam 710. Electrical traces 730 are shown, providing electrical connections to heating elements 735 and sensing contact 750 positioned on cantilevered beam 710.

Figure 8:
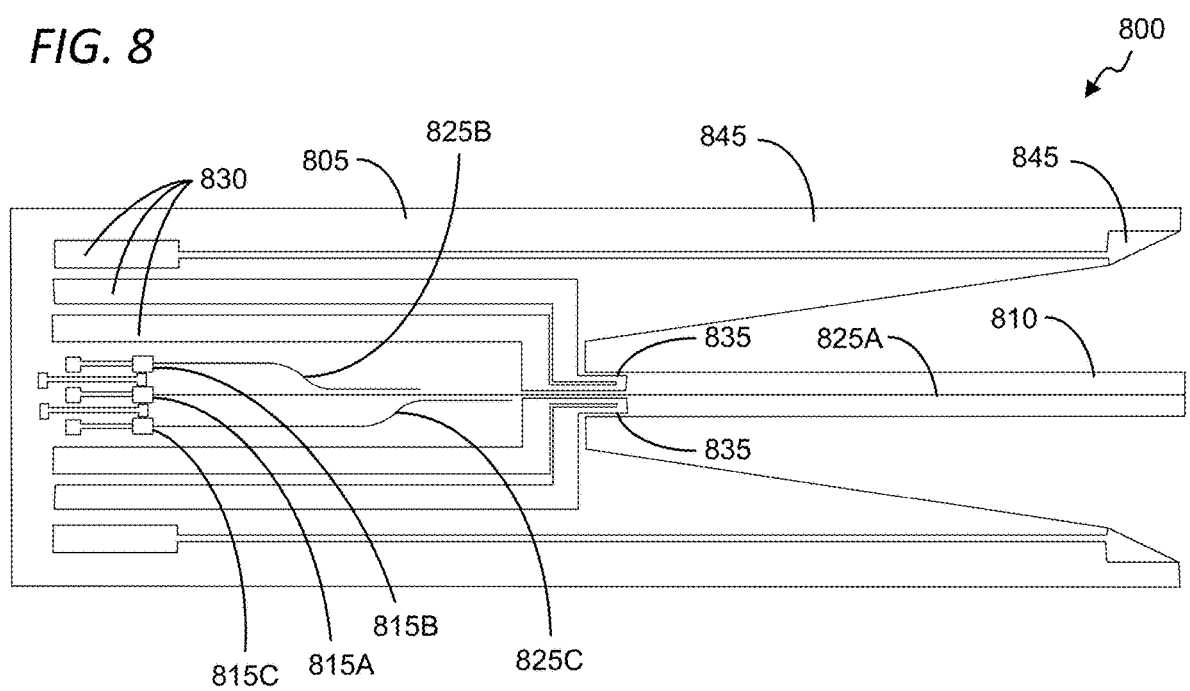
FIG. 8 provides a top plan schematic illustration of an optical scanning device accordance with some embodiments.

FIG. 8 provides a top plan view schematic illustration of an optical scanning device 800. Optical scanning device 800 is similar to optical scanning devices 400, 500, 600, and 700 depicted in FIGS. 4-7, but optical scanning device 800 includes local optical sources. Optical scanning device 800 includes base 805 and cantilevered beam 810. Instead of a v-groove and optical fiber, optical scanning device 800 includes a plurality of optical sources 815A, 815B, and 815C on base 805, which may correspond to different color (e.g., red, green, and blue) laser diodes, for example. Alternatively, the number of optical sources may be increased beyond three to increase brightness, or, in the case where more than three emission wavelengths are provided, to increase color gamut. It will be appreciated that, in some embodiments, both an optical fiber and a local optical source may be incorporated into an optical scanning device.

Optical scanning device 800 is illustrated in FIG. 8 as including position a sensing contact 845, which may be useful for identifying the distance between cantilevered beam 810 and a position sensing contacts (not visible in FIG. 8) on a bottom side of the cantilevered beam 810, such as by way of time-dependent capacitance measurements, to provide position information for cantilevered beam 810. Electrical contacts 830 are shown, providing electrical conductivity to heating elements 835 and sensing contact 845. A plurality of waveguides 825A, 825B and 825C are depicted in FIG. 8. Waveguide 825A is positioned on optical scanning device 800 and extends from base 805 to the distal end of cantilevered beam 810, and in direct optical communication with optical source 815A. Waveguides 825B and 825C are shown as positioned on base 805 and in direct optical communication with optical sources 815B and 815C, respectively. Optionally, waveguides 825B and 825C may extend from base 805 to the distal end of cantilevered beam 810, similar to waveguide 825A. However, in the configuration depicted in FIG. 8, directional optical coupling is employed, where the spacing and length of adjacent portions between optical waveguides 825A and 825B and between optical waveguides 825A and 825C are selected so as to transfer the light in optical waveguide 825B to optical waveguide 825A and to transfer the light in optical waveguide 825C to optical waveguide 825A, for example by evanescent coupling.

Figure 9:
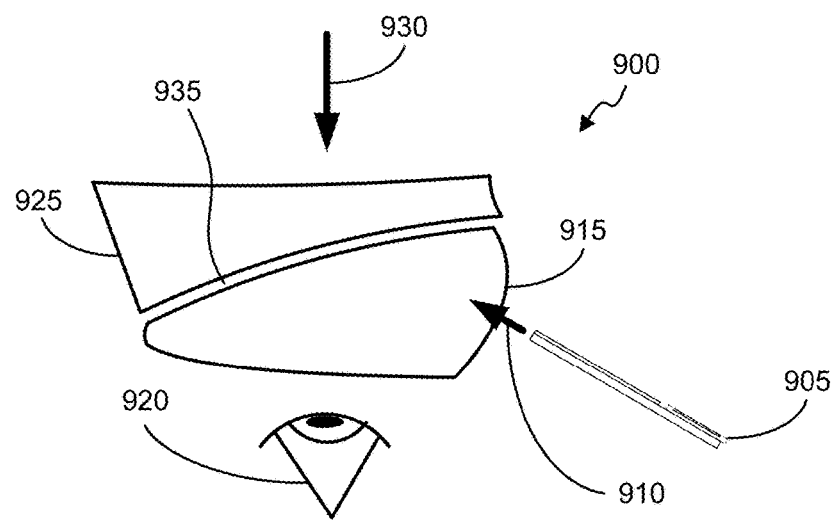
FIG. 9 provides a schematic illustration of components of an optical device in accordance with some embodiments.

FIG. 9 provides a schematic illustration of an eyepiece arrangement 900, which may be used as an alternative to the configuration depicted in FIG. 1, for example. In arrangement 900, optical scanning device 905 directly projects light 910 onto first optical element 915, which may direct at least a portion of light 910 from optical scanning device 905 to user eye position 920. Second optical element 925 may allow light 930 from the environment to directly pass to user eye position 920 to allow for the projected light 910 from optical scanning device to appear overlaid on and/or within the environmental light 930 for augmented reality viewing. Light from the optical scanning device 905 undergoes total internal reflection (TIR) at a gap 935 between the first optical element 915 and the second optical element 925, whereas light from the environment, due to its different incidence angular range, passes through the gap 935 and reaches the user eye position 920.

Figure 10:
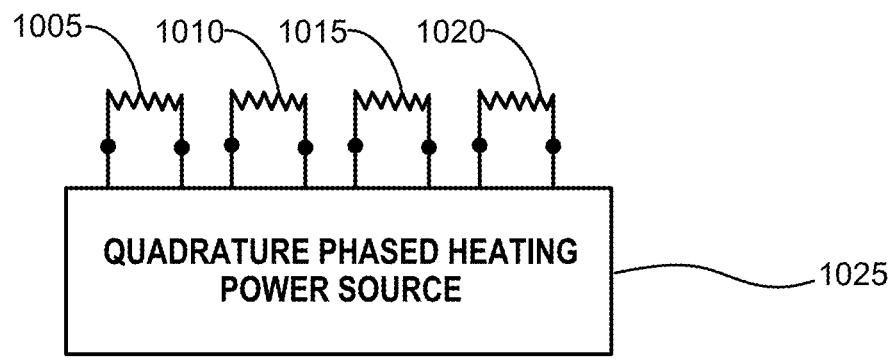
FIG. 10 provides a graphic overview of four separate heating elements used, in embodiments, for driving an optical scanning device.

It will be appreciated that multiple independent heating elements are included in the optical scanning devices depicted in FIGS. 4-8. Optionally, four heating elements are included in the optical scanning device, such as two heating elements on a top surface of a cantilevered beam and two heating elements on a bottom surface of a cantilevered beam. FIG. 10 provides a graphic overview of an electrical configuration of four heating elements used for inducing oscillations in an optical scanning device. In FIG. 10, heating elements 1005, 1010, 1015, and 1020 are positioned in independent electrical communication with a quadrature heating power signal source 1025.

Figure 11:
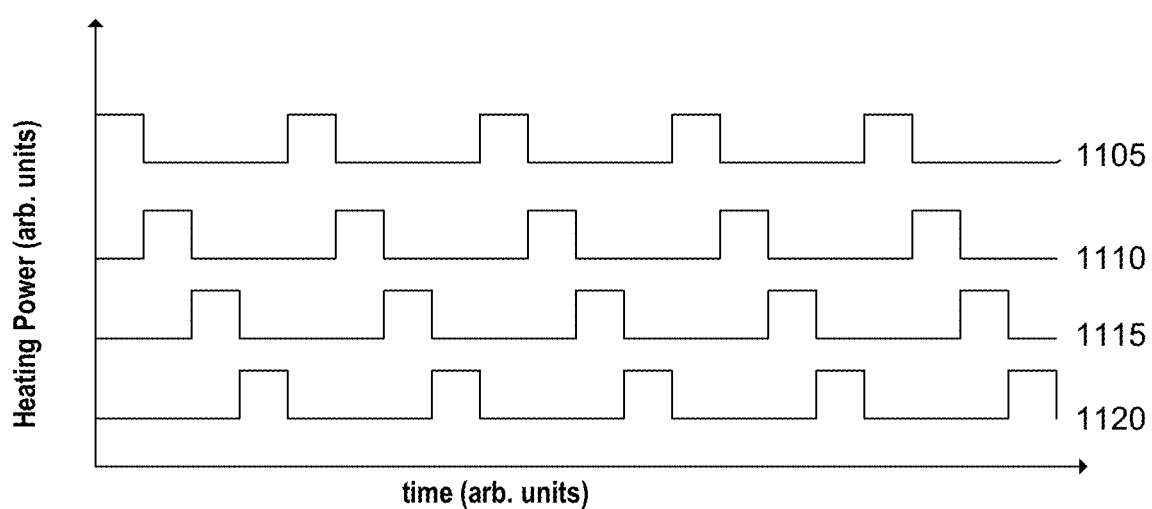
FIG. 11 provides a representative plot of heating power signals provided to four heating elements used, in embodiments, for driving an optical scanning device in a circular or spiral configuration.

FIG. 11 provides a representative plot of heating power signals 1105, 1110, 1115, and 1120, provided to the four heating elements for driving an optical scanning device in a circular or spiral pattern. The heating power signals are shown having a characteristic repetition rate and amplitude, which may vary depending on the magnitude of oscillation desired to be imparted. The phases of the heating power signals 1105, 1110, 1115, and 1120 are shifted by 90 degrees, which may provide for generating successive progressions of deflections of a cantilevered beam to generate an overall circular or spiral motion, for example.

It will be appreciated that the magnitude and duration of the heating power signals depicted in FIG. 11 are representative and for illustrative purposes and that the heating power signals may be the same as or different from those in FIG. 11. In general, the heating power signals may generally correspond to a form having a repetition frequency matching the resonant frequency of a cantilever beam. For example, the heating power signals may each correspond to a square wave of ¼ of the duration of the repetition period, as illustrated in FIG. 11, or to a square wave of longer than or less than ¼ of the duration of the repetition period. Optionally, the heating power signals may correspond to a pulse (e.g., a Gaussian shaped pulse), a triangular wave, or other non-square wave. Moreover, the magnitude of the heating power signals may be varied as a function of time to induce varied deflections in a cantilevered beam, which may be useful for generating a spiral or other deflection pattern of the distal end of the cantilevered beam. Additionally signals of constant amplitude can add energy to the cantilevered beam during successive pulse periods whereby the radial coordinate of the spiral pattern progressively increases from one waveform period to the next, until frictional losses equal the rate at which the pulsed signals add energy to the spiral oscillation. Once a predetermined maximum radial coordinate is achieved, the phase of the drive signals may be shifted by 180° to bring the cantilever beam back to its center position. Alternatively the cantilevered beam's orbit may be allowed to decay back to zero.

The optical scanning devices disclosed herein are useful in projection systems, such as to generate and project images or sequences of images to represent an animation or motion picture. By repeating a spiral oscillation and outputting different images, a frame-by-frame image projection may be generated. Various implementations of a projection system are useful with the optical scanning devices described herein, and by controlling the light being output and projected by the optical scanning device as a function of the position of the scanning device, any desirable image can be projected.

Figure 12:
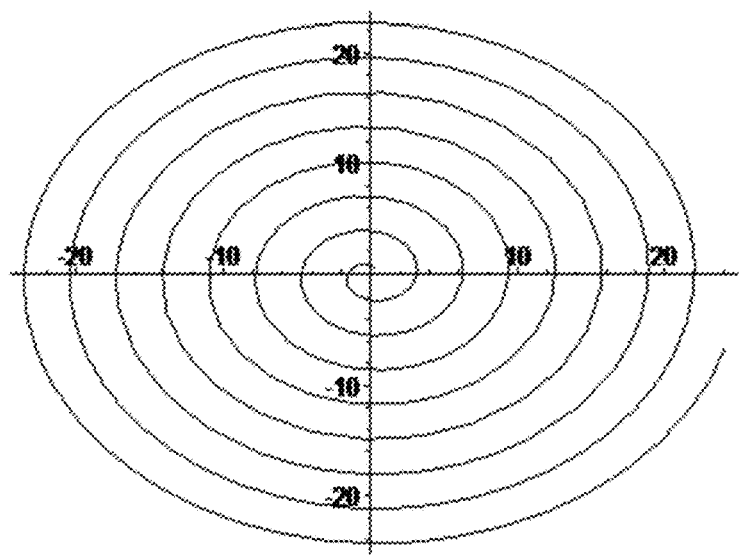
FIG. 12 provides a plot showing an example spiral path for a cantilever end in an optical scanning device.
Figure 13:
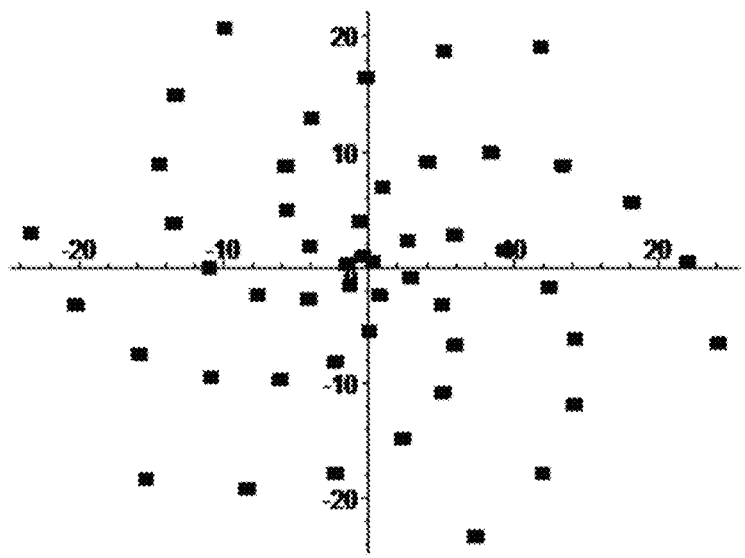
FIG. 13 provides a plot showing examples of equally time-spaced pixel positions along a spiral path.
Figure 14:
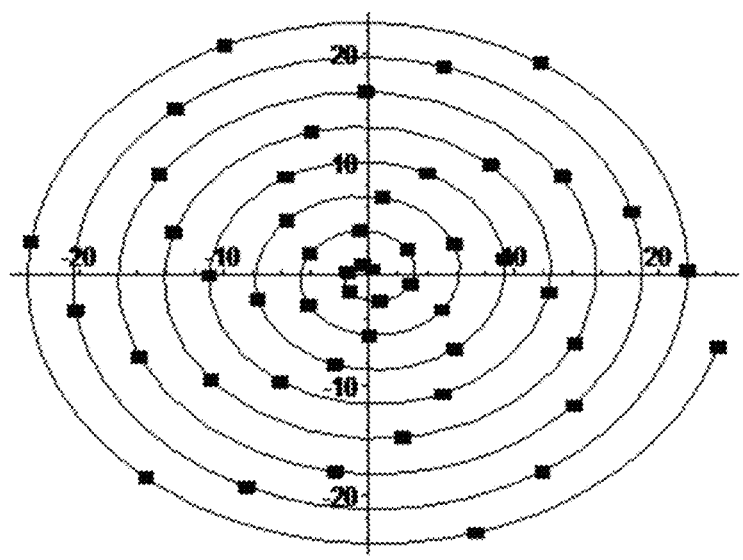
FIG. 14 provides a plot FIG. 12 and FIG. 13 overlaid on one another.

For example, FIG. 12 depicts a sample spiral scan pattern, which may represent the position of a distal end of a cantilevered beam or the location of a projected beam of light exiting from an optical waveguide at the distal end of the cantilevered beam. It will be appreciated that the depicted spiral scan pattern is merely exemplary and that other scan patterns may be useful with various embodiments. For example, the spiral scan pattern may represent a center to periphery scan direction or a periphery to center scan direction. Additionally, such scan patterns may be clockwise or counterclockwise. FIG. 13 depicts positions of locations equally spaced in time of a distal end of a cantilevered beam oscillating according to the spiral scan pattern depicted in FIG. 12 or a positions of a beam of light projecting from an optical waveguide on the cantilevered beam. The depictions in FIGS. 12 and 13 are illustrated overlaid on one another in FIG. 14. Use of such a scan pattern and projection positions may allow for projection of an image, or series of images upon repetition of the spiral scan pattern.

It will be appreciated that the position locations depicted in FIG. 13 may correspond to pixel output locations. Note that the coupling optic 245 maps each position to a specific angle of a collimated beam that is output by the coupling optic 245, so that each pixel is described by angular coordinates in the field of view produced by the eyepieces 117. The pixels making up digital images and digital frames of a video are commonly stored in a rectangular grid of pixels in a raster graphic structure, which may not be directly compatible with the pixel output locations depicted in FIG. 13 and may require for reading particular pixels near the center of an image first and pixels near the periphery later. In addition, pixel interpolation and manipulation of the pixels in a raster graphic structure may be necessary for the image projected in a spiral scan pattern to appear the same as that stored in the raster graphic structure. For example, the x-y addresses of pixels needed to be output by a spiral scan projection system like those disclosed herein may be obtained by use of a spiral scan address sequence generator. A random access read circuit may aid in obtaining the corresponding pixel information from a frame buffer storing pixels in a raster graphic structure. The digital pixel information may be converted to one or more analog values, which may be then amplified, for driving one or more light sources, such as laser diodes, to provide appropriate intensities for output.

To correctly project the image, the pixel information and output light intensities will need to be matched in time with the projection location of the output light, which is dictated by the position of the distal end of the cantilevered beam in the optical projection system. It will be appreciated that one or more phase delays between a source timing signal may be encountered due to the components of the optical projection system. For example, a phase delay may be introduced in one or more of the processes of reading pixel information according to a spiral scan address sequence, digital pixel to analog laser drive signal conversion, and laser drive signal amplification. Additional phase delays may be introduced during the process of oscillating the cantilevered beam, which may arise from drive electronics associated with generating a heating power signal, or with the process of heating the portions of the cantilevered beam to generate a deflection of the cantilevered beam. Accordingly, as described further herein below, tracking a position of the cantilevered beam, such as by way of capacitance measurements, may allow for correction and/or compensation of all the various phase delays that may be introduced.

Figure 15:
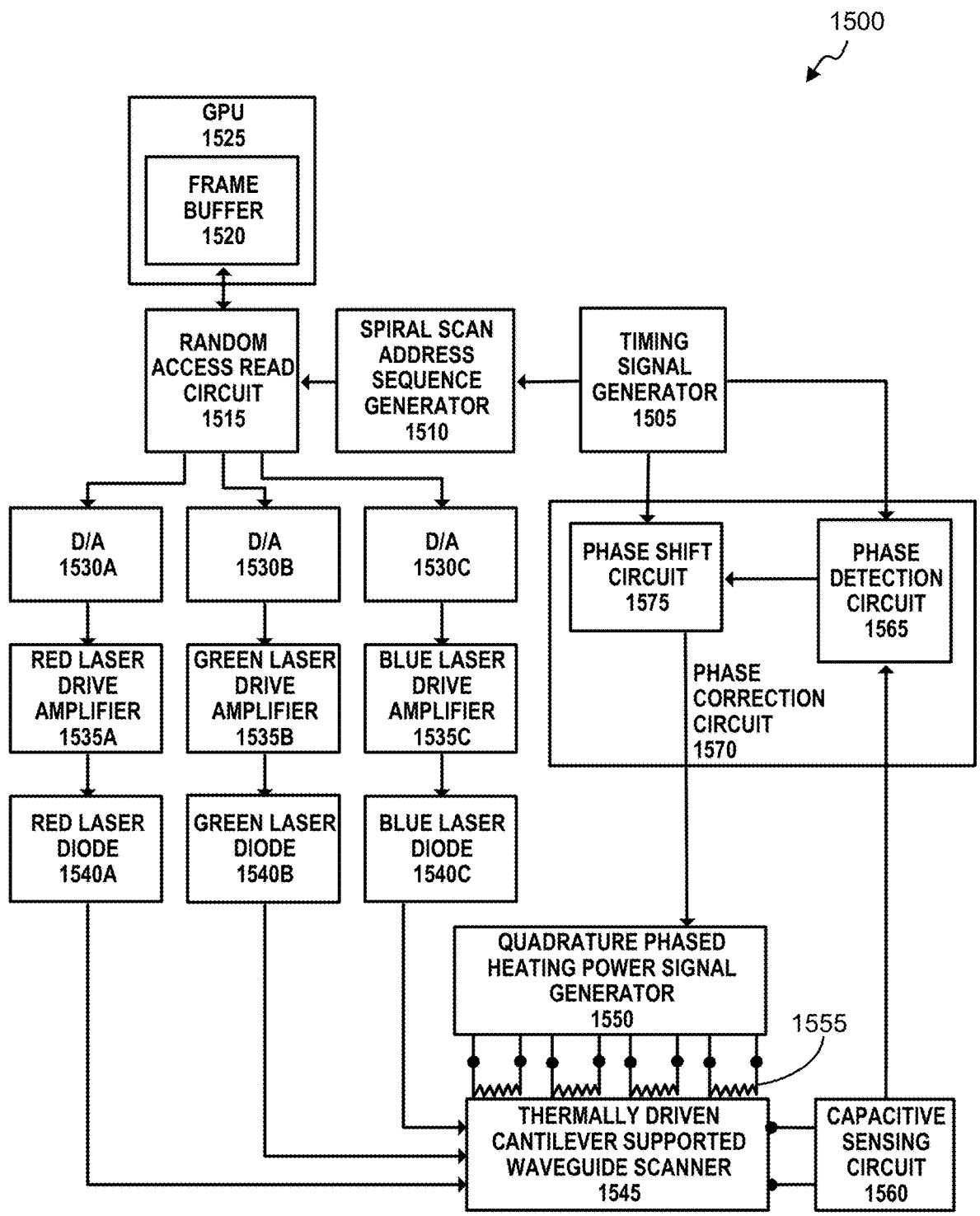
FIG. 15 provides a block diagram representing components of a system for driving an optical scanning device in accordance with some embodiments.
Figure 16:
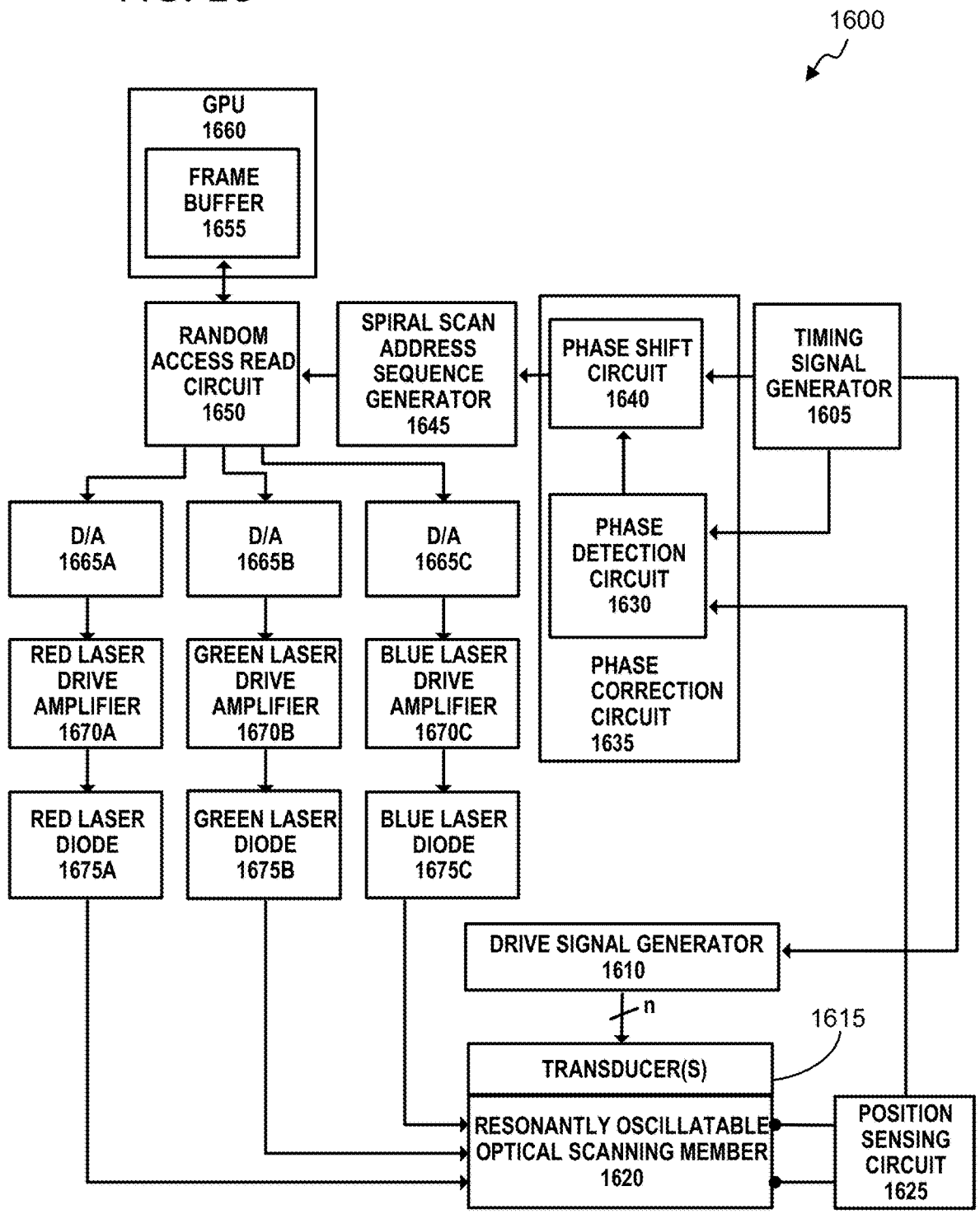
FIG. 16 provides a block diagram representing components of a system for driving an optical scanning device in accordance with some embodiments.

FIGS. 15 and 16 depict block diagrams representing components of systems for driving optical scanning devices that incorporate a phase correction circuit to compensate for phase delays introduced during projection of an image. In FIG. 15, the phase delay is corrected on the mechanical side, where a phase adjusted signal is provided to a mechanical force transducer is coupled to a cantilevered beam (i.e., heating elements in thermal communication with the cantilevered beam). In FIG. 16, the phase delay is corrected on the optical side, where a phase adjusted signal is provided to a pixel sequence address generator used to obtain pixel information for projection.

In FIG. 15, system 1500 includes a timing signal generator 1505 that provides a timing signal to spiral scan address sequence generator 1510. The address sequence generated by spiral scan address sequence generator 1510 is provided to random access read circuit 1515 which obtains pixel information from a frame buffer 1520 according to the address sequence. Frame buffer 1520 optionally resides within a graphics processing unit 1525. The random access read circuit 1515 provides digital pixel information for three colors (e.g., red, green, and blue) to digital to analog converters 1530A, 1530B, and 1530C, which provide analog outputs to laser drive amplifiers 1535A, 1535B, and 1535C to provide current/voltage to laser diodes 1540A, 1540B, and 1540C. The laser diodes output light that is coupled to a waveguide on a thermally driven cantilever supported waveguide scanner 1545 for projection. It will be appreciated that other resonantly oscillatable optical scanning members besides a cantilever supported waveguide scanner may be used, such as a free-ended optical fiber.

To position the cantilever to the appropriate position for outputting a particular pixel value, a quadrature phased heating power signal generator 1550 outputs heating signals for driving heating elements 1555 on the thermally driven cantilever supported waveguide scanner 1545. It will be appreciated that other electrical signal to mechanical force transducers may be used in place of the thermally driven cantilever, such as a piezoelectric based system or an electromagnetic based system.

A capacitive sensing circuit 1560 is positioned to detect a capacitance value representative of a position of the cantilever. It will be appreciated that position sensing circuitry and components may be used in place of capacitive sensing circuit, such as a piezoresistor- or strain-sensor-based circuit. The capacitance value from capacitive sensing circuit 1560 is provided to a phase detection circuit 1565 of a phase correction circuit 1570, which also receives the source timing signal from timing signal generator 1505. A phase shift circuit 1575 of the phase correction circuit 1570 also receives source timing signal from timing signal generator 1505 and generates a phase adjusted timing signal that is provided to quadrature phased heating power signal generator 1550 to appropriately position the cantilever.

In FIG. 16, system 1600 includes a timing signal generator 1605 that provides a timing signal to a drive signal generator 1610 for generating one or more electrical signals provided to one or more electrical signal to mechanical force transducers 1615 for mechanically oscillating a resonantly oscillatable optical scanning member 1620. It will be appreciated that electrical signal to mechanical force transducers 1615 may correspond to resistive heating elements used to induce oscillation resonantly oscillatable optical scanning member 1620, as described above, and that other electrical signal to mechanical force transducers may be used, such as piezoelectric or electromagnetic elements. In addition, it will be appreciated that resonantly oscillatable optical scanning member 1620 may correspond to a cantilevered beam having one or more optical waveguides thereon, as described above, and that other resonantly oscillatable optical scanning members may be used, such as a free-ended (cantilevered) optical fiber.

A position sensing circuit 1625 is used to identify a position of the resonantly oscillatable optical scanning member and provide position feedback to a phase detection circuit 1630 of a phase correction circuit 1635, which also receives the source timing signal from timing signal generator 1605. It will again be appreciated that position sensing circuit 1625 may correspond to a capacitance sensing circuit, as described above, and that other position sensing circuits may be used, such as a piezoresistor- or strain-sensor-based position sensing circuit. A phase shift circuit 1640 of the phase correction circuit 1635 also receives source timing signal from timing signal generator 1605 to generate a phase adjusted timing signal.

The phase adjusted timing signal is provided to additional circuitry for appropriately driving optical elements to output a suitable pixel value based on the position of the resonantly oscillatable optical scanning member 1620. As illustrated, the phase adjusted timing signal is provided to spiral scan address sequence generator 1645. The address sequence generated by spiral scan address sequence generator 1645 is provided to random access read circuit 1650, which obtains pixel information from a frame buffer 1655 according to the address sequence. Frame buffer 1655 optionally resides within a graphics processing unit 1660. The random access read circuit 1650 provides digital pixel information for three colors (e.g., red, green, and blue) to digital to analog converters 1665A, 1665B, and 1665C, which provide analog outputs to laser drive amplifiers 1670A, 1670B, and 1670C to provide current/voltage to laser diodes 1675A, 1675B, and 1675C. The laser diodes output light that is coupled to resonantly oscillatable optical scanning member 1620 for projection.

Figure 17:
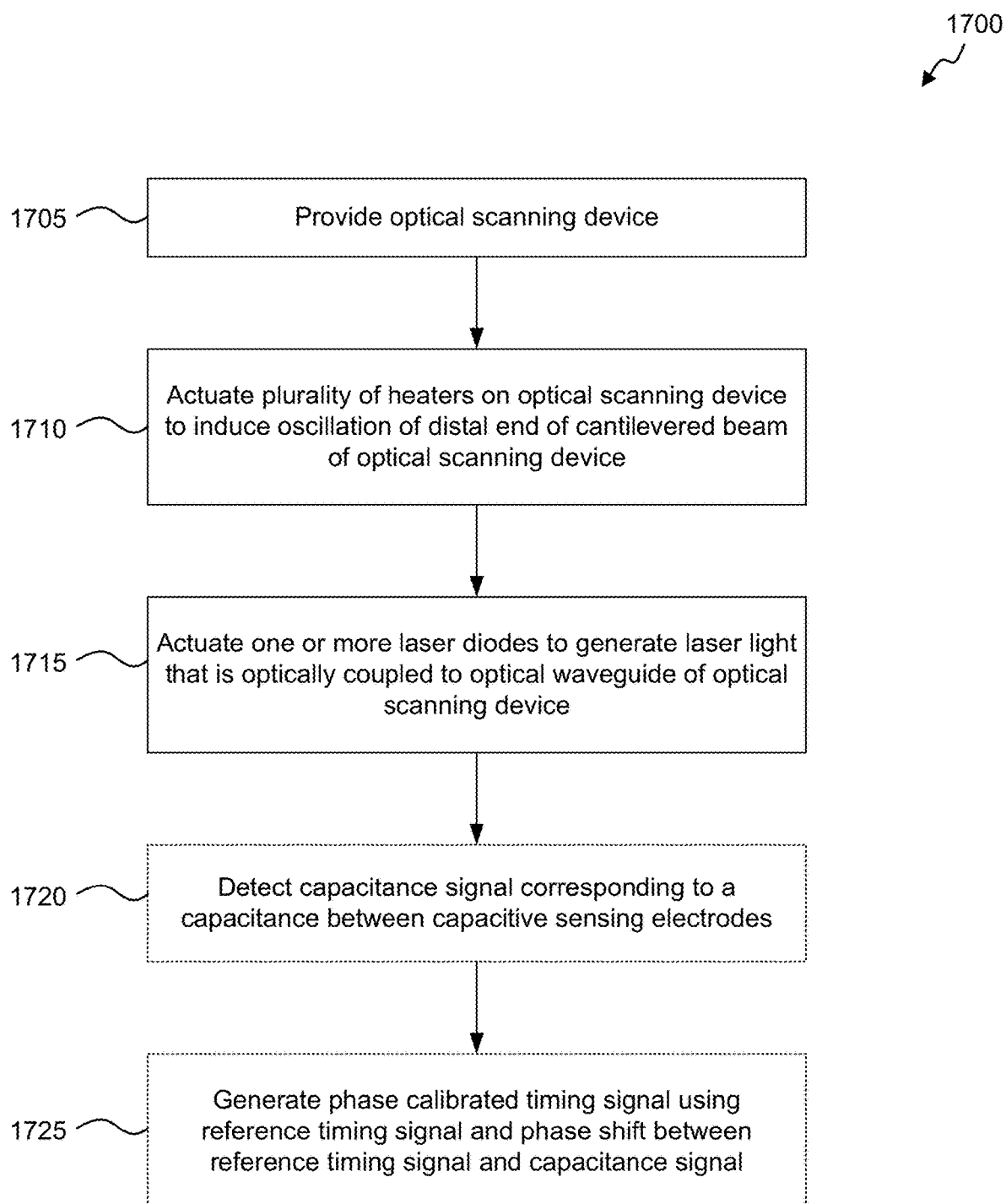
FIG. 17 provides a flow diagram describing aspects of an optical projection method.

FIG. 17 provides a flow diagram providing an overview of a method 1700 of projecting an image. It will be appreciated that the blocks identified in FIG. 17 may correspond to operations of a method and may be performed in the specific order identified in FIG. 17 or in any other order. Optionally, blocks in FIG. 17 may be performed simultaneously or sequentially. Additionally, each of the blocks in FIG. 17 may be optionally and independently repeated one or more times.

At block 1705, an optical scanning device is provided, such as an optical scanning device comprising a base, a cantilevered beam extending from the base and including a proximal end attached to the base and a free distal end, an optical waveguide positioned on the base and the cantilevered beam and extending from the base to the distal end of the cantilevered beam, and a plurality of heaters disposed on the cantilevered beam. It will be appreciated that the optical scanning device can include other components than those specified above, including an optical source, which may correspond to an optical fiber positioned in optical communication with a laser diode, for example, or a laser diode directly in optical communication with the optical waveguide. In addition, electrical traces or electrodes may be included in the optical scanning device, such as to provide electrical connectivity to the plurality of heaters. Optionally, the optical scanning device may include one or more capacitive sensing metallizations disposed on the cantilevered beam or adjacent to the cantilevered beam, such as on a side arm.

At block 1710, the plurality of heaters are actuated to induce oscillation of the distal end of the cantilevered beam of the optical scanning device. As described above, the plurality of heaters may each be actuated in sequence to induce a desired oscillation. For example, the heaters may be actuated using electrical signals similar to those depicted in FIG. 11 to induce a spiral shaped oscillation. It will be appreciated that actuating the plurality of heaters may increase temperatures of a plurality of regions of the cantilevered beam to induce thermal expansion of the plurality of regions, such as quadrant sections, and cause deflection of the distal end of the cantilevered beam. Use of materials with high thermal conductivity, such as silicon, silicon carbide, or diamond may be useful to allow the heat generated to quickly dissipate through thermal conduction once the desired deflection is created. Oscillations of any desired frequency may be induced, though oscillations having a frequency matching the natural resonant frequency of the cantilevered beam may be most desirable.

At block 1715, one or more laser diodes are actuated to generate laser light that is optically coupled to the optical waveguide of the optical scanning device for projection therefrom. As described above, the one or more laser diodes may be directly included on the base of the optical scanning device. Optionally the one or more laser diodes are located remote from the base of the optical scanning device but are in optical communication with the optical waveguide, such as by way of one or more intermediate optical waveguides and/or optical fibers.

It will be appreciated that blocks 1710 and 1715 may be repeated as desired to generate multiple projections in sequence. For example, the one or more laser diodes may be actuated multiple times as the cantilevered beam oscillates to generate a spatial sequence of projected light. Similarly, the plurality of heaters may be actuated multiple times to maintain oscillation of the cantilevered beam in a desired pattern, such as to allow multiple spiral oscillations in sequence to occur. In some embodiments, the oscillations are allowed to dampen so that the cantilevered beam can return to a neutral position before beginning the next oscillation.

As noted above, the optical scanning device may include multiple capacitive sensing metallizations, which may also be referred to herein as capacitive sensing electrodes. As depicted in block 1720, the method may optionally comprise detecting a capacitance signal corresponding to a capacitance between the capacitive sensing electrodes. For a capacitance between a first capacitive sensing electrode disposed on the cantilevered beam and a second capacitive sensing electrode disposed adjacent to the cantilevered beam, the capacitance may be modulated as the cantilevered beam oscillates and may be representative of a proximity between the capacitive sensing electrodes and/or the position of the cantilevered beam. The capacitance may be sensed by coupling an AC voltage signal between the first and second capacitance sensing electrode and sensing the amplitude of the signal that is coupled through. The capacitance between the first and second capacitance sensing electrodes may be included in a voltage divider, in series with a fixed impedance. The frequency of the sensing signal may be selected to be far from a resonant frequency of the cantilevered beam. The phase detection circuit (1565, FIG. 15, or 1630, FIG. 16) may include an envelope detector or a demodulator to process the signal coupled between the first and second capacitance sensing electrodes in order to obtain a capacitance modulated signal having a frequency corresponding to the oscillation of the cantilevered beam.

As described above the laser diode may output light while the cantilevered beam is oscillating and the position of the cantilevered beam may dictate the direction and position where the light is projected. In order for the projected light to be positioned correctly to display an image (e.g., a sequence of projected pixels), the position of the cantilevered beam must be appropriately matched to the corresponding light output (e.g., color and intensity distribution). For oscillations of the cantilevered beam in a spiral, a spiral pattern pixel data information may be obtained from a frame buffer and the pixel data may be converted to one or more drive signals provided to the one or more laser diodes. If the plurality of heaters and laser diodes are actuated using the same timing signal, the position of the cantilevered beam and the light output may be out of sequence due to one or more delays incurred in the system. Having position information about the cantilevered beam, such as by way of the capacitance signal, may allow this delay to be accommodated. Thus, the capacitance signal may optionally be used, such as shown at block 1725, to generate a phase calibrated timing signal, such as by identifying a phase shift between the capacitance signal and a reference timing signal.

Two different configurations of the phase calibrated and reference timing signal may be used. For example, the plurality of heaters may be actuated according to the reference timing signal while the one or more laser diodes are actuated according to the phase calibrated timing signal. Alternatively, the one or more laser diodes may be actuated according to the reference timing signal while the plurality of heaters are actuated according to the phase calibrated timing signal. In either of these ways, delays can be accommodated to allow for correct projection of an image where the position of the cantilevered beam and generation of laser light are correctly timed.

Figure 18:
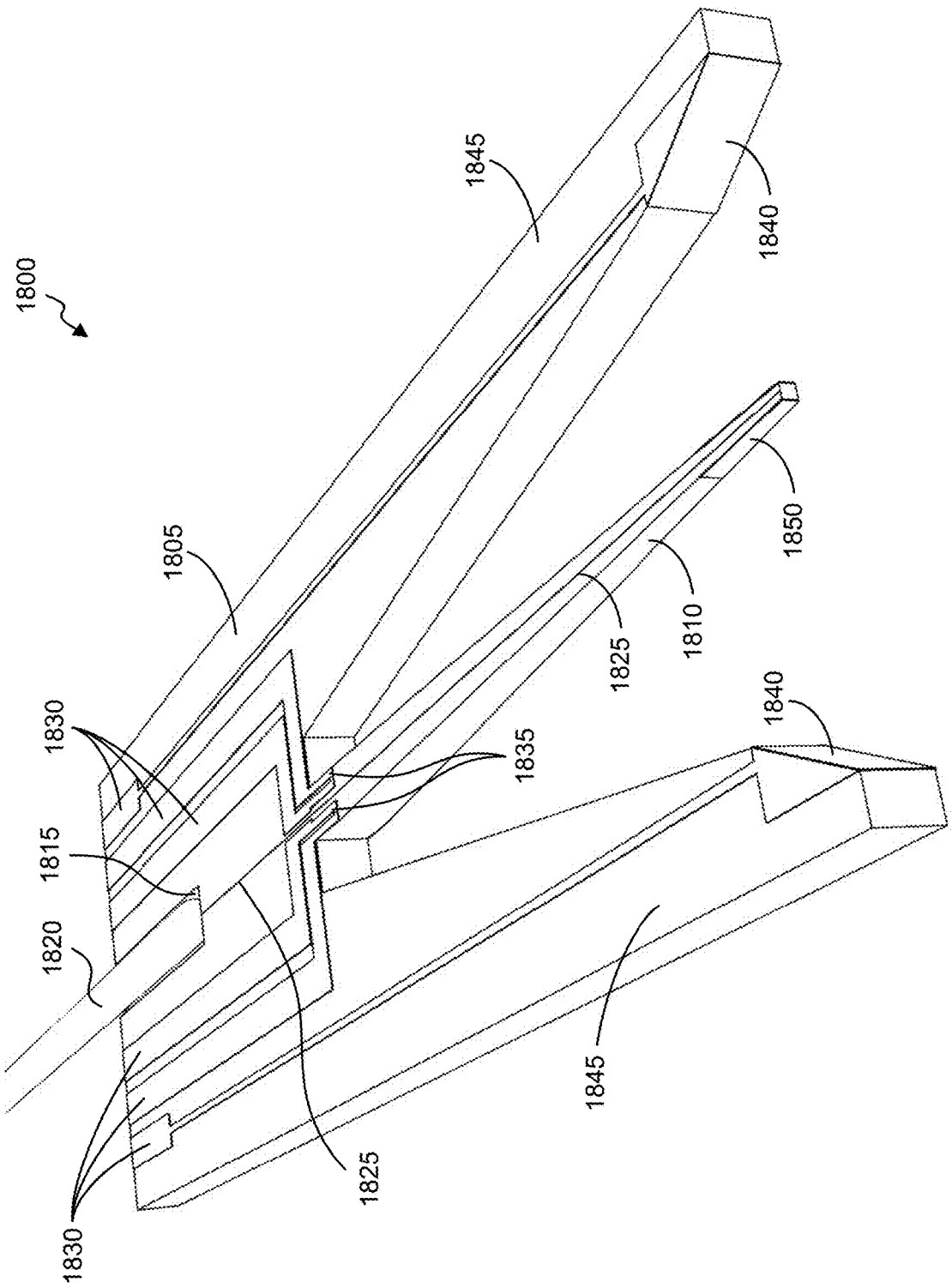
FIG. 18 provides a perspective schematic view of an optical scanning device in accordance with some embodiments.

Other configurations and features of the cantilevered beam and optical scanning device are contemplated. For example, FIG. 18 depicts a perspective schematic illustration of another optical scanning device 1800. Optical scanning device 1800 includes base 1805 and cantilevered beam 1810. Base 1805 includes a v-groove 1815 for positioning an optical fiber 1820, such as a lensed optical fiber, at a position for optical communication between a core of optical fiber 1820 and an optical waveguide 1825 supported on a top surface of cantilevered beam 1810. Base 1805 also includes electrical contacts 1830, arranged in electrical communication with other elements, including heating elements 1835 disposed on a top side of cantilevered beam 1810. Additional heating elements 1835 (not visible in FIG. 18) may be positioned on a bottom side of cantilevered beam 1810. Additional electrical contacts 1830 (not visible in FIG. 18), may be also positioned on a bottom side of base 1805, such as to provide electrical connections to heating elements 1835 positioned on the bottom side of cantilevered beam 1810 and to position sensing contact 1840 located near a distal end of cantilevered beam 1810.

As illustrated, heating elements 1835 are located at a proximal end of cantilevered beam 1810, near to base 1805, while optical waveguide 1825 extends from base 1805 and the proximal end of cantilevered beam 1810 to a distal end of cantilevered beam 1810. In addition, cantilevered beam 1810 has a tapered width and/or thickness. For example, proximal end of cantilevered beam 1810 has a thickness that is greater than the thickness of cantilevered beam 1810 at the distal end. Similarly, proximal end of cantilevered beam 1810 has a width that is greater than the thickness of cantilevered beam 1810 at the distal end. It will be appreciated that tapering the cross-sectional dimension(s) of the cantilevered beam by reducing a width and/or thickness dimension of cantilevered beam 1810 in this way may allow for an increase in the resonant frequency of cantilevered beam 1810. Increasing the resonant frequency of cantilevered beam 1810 may be useful, for example, in increasing the rate at which oscillations occur in the cantilevered beam 1810. In embodiments, such an increased resonant frequency may allow for an optical projector employing optical scanning device 1800 to have a higher frame rate.

Optical scanning device 1800 is illustrated in FIG. 18 as including position sensing contacts 1840 on extensions 1845 and position sensing contact 1850 on cantilevered beam 1810, which may be useful for sensing the distance between cantilevered beam 1810 and position sensing contacts 1840, such as by way of time-dependent capacitance measurements between position sensing contacts 1840 and position sensing contact 1850, to provide position information for cantilevered beam 1810. As illustrated in FIG. 18, position sensing contacts 1840 are positioned on a side surface and a top surface near the distal end of extensions 1845. Optionally, position sensing contacts 1840 may be positioned on a bottom surface of extensions 1845 in addition to or alternative to positioning on a top surface. Position sensing contact 1850 is depicted as positioned on a side surface of cantilevered beam 1810 and may further be positioned on a bottom surface of cantilevered beam 1810.

The terms and expressions which have been employed herein are used as terms of description and not of limitation, and there is no intention in the use of such terms and expressions of excluding any equivalents of the features shown and described or portions thereof, but it is recognized that various modifications are possible within the scope of the invention claimed. Thus, it will be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

What is claimed is:

1. An optical scanning device comprising:
   a base;
   a cantilevered beam extending from the base, the cantilevered beam including a proximal end attached to the base and a distal end;
   at least one optical waveguide positioned on the base and the cantilevered beam and extending from the base along the cantilevered beam from the proximate end to the distal end; and
   a plurality of heaters disposed on the cantilevered beam, wherein heating of the plurality of heaters causes a deflection of the cantilevered beam and light that is transferring through the cantilevered beam.

2. The optical scanning device of claim 1, wherein the plurality of heaters are disposed on the cantilevered beam proximate to the proximal end.

3. The optical scanning device of claim 1, wherein the plurality of heaters comprise four heaters.

4. The optical scanning device of claim 1, wherein the plurality of heaters are spaced about the cantilevered beam.

5. The optical scanning device of claim 1, wherein the cantilevered beam has a top side and a bottom side.

6. The optical scanning device of claim 5, wherein the plurality of heaters includes a first heater, a second heater, a third heater, and a fourth heater, and wherein the first heater and the second heater are disposed on the top side and the third heater and the fourth heater are disposed on the bottom side.

7. The optical scanning device of claim 1, wherein the base and the cantilevered beam comprise silicon carbide.

8. The optical scanning device of claim 1, wherein the cantilevered beam comprises silicon, silicon carbide, or diamond.

9. The optical scanning device of claim 1, wherein the plurality of heaters comprise platinum or silicon.

10. The optical scanning device of claim 1, further comprising at least one laser diode positioned on the base, wherein the at least one laser diode is optically coupled to the at least one optical waveguide.

11. The optical scanning device of claim 1, further comprising a plurality of electrical traces independently extending over the base to the plurality of heaters.

12. The optical scanning device of claim 1, further comprising an optical fiber mechanically engaged with the base, wherein the optical fiber is optically coupled to the at least one optical waveguide.

13. The optical scanning device of claim 1, wherein the at least one optical waveguide has a cross-sectional width less than or equal to 10 microns and a cross-sectional height less than or equal to 10 microns.

14. The optical scanning device of claim 1, further comprising:
a first side arm extending from the base and adjacent to a first side of the cantilevered beam.

15. The optical scanning device of claim 14, further comprising:
a second side arm extending from the base and adjacent to a second side of the cantilevered beam.

16. The optical scanning device of claim 14, further comprising:
a first capacitive sensing metallization disposed on the cantilevered beam; and
a second capacitive sensing metallization disposed on the first side arm.

17. The optical scanning device of claim 1, wherein the cantilevered beam has a proximal end cross-sectional dimension and a distal end cross-sectional dimension and wherein the proximal end cross-sectional dimension exceeds the distal end cross-sectional dimension.

18. Augmented reality glasses comprising:
an optical scanning device comprising:
a base;
a cantilevered beam extending from the base, the cantilevered beam including a proximal end attached to the base and a distal end;
at least one optical waveguide positioned on the base and the cantilevered beam and extending from the base along the cantilevered beam from the proximate end to the distal end; and
a plurality of heaters disposed on the cantilevered beam, wherein heating of the plurality of heaters causes a deflection of the cantilevered beam and light that is transferring through the cantilevered beam; and
a transparent eyepiece optically coupled to the optical scanning device, wherein the transparent eyepiece is configured to couple light received from the optical scanning device to an eye position defined in relation to the transparent eyepiece.

19. An optical scanning system comprising:
a base;
a cantilevered beam extending from the base, the cantilevered beam including a proximal end attached to the base and a distal end;
at least one optical waveguide positioned on the base and the cantilevered beam and extending from the base along the cantilevered beam from the proximate end to the distal end;
a first capacitive sensing electrode disposed on the cantilevered beam; and
a second capacitive sensing electrode disposed adjacent to the cantilevered beam; and
a plurality of heaters disposed on the cantilevered beam, wherein heating of the plurality of heaters causes a deflection of the cantilevered beam and light that is transferring through the cantilevered beam.

20. The optical scanning system of claim 19, further comprising:
a capacitive sensing circuit coupled to the first capacitive sensing electrode and the second capacitive sensing electrode;
a timing signal generator;
a phase detection circuit coupled to the timing signal generator and the capacitive sensing circuit and configured to receive a timing signal from the timing signal generator, receive a varying capacitance modulated signal from the capacitive sensing circuit, and output a phase shift control signal at a phase shift control signal output; wherein
a phase shift circuit having a timing signal input coupled to the timing signal generator, a phase control input coupled to the phase shift control signal output, and a phase adjusted signal output, wherein the phase shift circuit is configured to phase shift the timing signal by an amount in accordance with the phase shift control signal to produce a phase calibrated timing signal; and
a multiphase heating power signal generator coupled to the phase shift circuit, the multiphase heating power signal generator including a plurality of heating signal outputs that are coupled to the plurality of heaters disposed on the cantilevered beam, wherein the multiphase heating power signal generator is configured to receive the phase calibrated timing signal from the phase shift circuit and to output, at the plurality of heating signal outputs, a plurality of heating power signals that are timed based on the phase calibrated timing signal.

* * * * *